United States Patent
O'Brien et al.

(10) Patent No.: US 10,128,894 B1
(45) Date of Patent: Nov. 13, 2018

(54) ACTIVE ANTENNA CALIBRATION

(71) Applicant: Analog Devices Global, Hamilton (BM)

(72) Inventors: Michael W. O'Brien, Cork (IE); Michael F. Keaveney, Lisnagry (IE); Emil Ivanov Entchev, Ballincollig (IE); James Breslin, Ennis (IE)

(73) Assignee: ANALOG DEVICES GLOBAL, Hamilton (BM)

( * ) Notice: Subject to any disclaimer, the term of this patent is extended or adjusted under 35 U.S.C. 154(b) by 0 days.

(21) Appl. No.: 15/590,903

(22) Filed: May 9, 2017

(51) Int. Cl.
| H04B 17/21 | (2015.01) |
| H04B 17/14 | (2015.01) |
| H04B 1/403 | (2015.01) |
| H04B 17/12 | (2015.01) |

(52) U.S. Cl.
CPC ............. *H04B 1/403* (2013.01); *H04B 17/12* (2015.01); *H04B 17/21* (2015.01)

(58) Field of Classification Search
CPC .................................................. G06K 7/10356
See application file for complete search history.

(56) References Cited

U.S. PATENT DOCUMENTS

| 5,811,972 | A | | 9/1998 | Thompson et al. |
| 6,157,343 | A | * | 12/2000 | Andersson ............. H01Q 3/267 342/174 |
| 6,252,542 | B1 | * | 6/2001 | Sikina .................... H01Q 3/267 342/174 |
| 6,353,406 | B1 | * | 3/2002 | Lanzl ...................... G01S 13/84 340/10.1 |
| 6,441,783 | B1 | * | 8/2002 | Dean ....................... G01S 7/032 342/372 |
| 6,480,153 | B1 | * | 11/2002 | Jung ....................... H01Q 3/267 342/174 |
| 6,690,952 | B2 | | 2/2004 | Nishimori et al. |
| 6,735,182 | B1 | | 5/2004 | Nishimori et al. |
| 7,714,776 | B2 | | 5/2010 | Cooper et al. |
| 8,665,845 | B2 | | 3/2014 | O'Keeffe et al. |
| 8,665,846 | B2 | | 3/2014 | O'Keefe |
| 8,913,699 | B2 | | 12/2014 | O'Keeffe et al. |
| 8,976,845 | B2 | | 3/2015 | O'Keeffe et al. |
| 9,035,828 | B2 | | 5/2015 | O'Keeffe et al. |
| 9,332,519 | B2 | * | 5/2016 | Kludt .................... H04W 60/00 |
| 9,503,109 | B2 | | 11/2016 | McLaurin et al. |
| 9,525,204 | B2 | * | 12/2016 | O'Keeffe ............. H01Q 3/2605 |
| 9,614,557 | B1 | | 4/2017 | Mayer et al. |
| 9,628,256 | B2 | | 4/2017 | O'Keeffe et al. |
| 9,692,530 | B2 | * | 6/2017 | O'Keeffe ............... H01Q 21/24 |
| 9,768,852 | B2 | * | 9/2017 | Ling ...................... H04B 7/086 |
| 9,906,285 | B2 | * | 2/2018 | Ling .................... H04B 7/0617 |
| 2005/0130595 | A1 | | 6/2005 | Shurvinton et al. |

(Continued)

OTHER PUBLICATIONS

U.S. Appl. No. 15/147,408, filed May 5, 2016.

*Primary Examiner* — Cindy Trandai
(74) *Attorney, Agent, or Firm* — Knobbe, Martens, Olson & Bear, LLP

(57) ABSTRACT

Aspects of this disclosure relate to active antenna calibration. In some embodiments, a local oscillator signal can be injected into the receive path for misalignment measurement and calibration of the receive path, a transmit signal from a transmit path can be coupled to a receive path, and the transmit path can be calibrated relative to the receive path.

22 Claims, 12 Drawing Sheets

(56) References Cited

U.S. PATENT DOCUMENTS

| | | | |
|---|---|---|---|
| 2006/0044185 A1* | 3/2006 | Jin | H01Q 3/267 342/368 |
| 2006/0234694 A1* | 10/2006 | Kawasaki | H01Q 3/267 455/423 |
| 2006/0240785 A1* | 10/2006 | Fischer | H01Q 1/246 455/78 |
| 2008/0153433 A1 | 6/2008 | Pallonen et al. | |
| 2009/0253385 A1 | 10/2009 | Dent et al. | |
| 2011/0053646 A1 | 3/2011 | Kundmann et al. | |
| 2011/0235749 A1* | 9/2011 | Kenington | H01Q 3/2605 375/296 |
| 2011/0244819 A1* | 10/2011 | Schlee | H01Q 3/267 455/226.1 |
| 2011/0260920 A1* | 10/2011 | Dybdal | G01S 7/2813 342/379 |
| 2012/0025927 A1* | 2/2012 | Yan | H03K 17/063 333/103 |
| 2012/0027066 A1* | 2/2012 | O'Keeffe | H01Q 1/246 375/224 |
| 2012/0196591 A1* | 8/2012 | O'Keeffe | H01Q 1/246 455/427 |
| 2012/0287978 A1* | 11/2012 | O'Keeffe | H01Q 21/245 375/222 |
| 2012/0330151 A1* | 12/2012 | Weinstein | A61B 5/0402 600/427 |
| 2013/0010851 A1* | 1/2013 | Jaeger | H04L 27/04 375/224 |
| 2013/0079060 A1* | 3/2013 | Pivit | H01Q 3/267 455/561 |
| 2013/0157601 A1 | 6/2013 | O'Keeffe et al. | |
| 2014/0269856 A1* | 9/2014 | Gianvittorio | G01S 7/032 375/219 |
| 2016/0127003 A1* | 5/2016 | Xu | H01Q 1/246 455/562.1 |
| 2016/0146931 A1* | 5/2016 | Rao | H01Q 1/3233 342/59 |
| 2016/0191176 A1* | 6/2016 | O'Keeffe | H01Q 3/267 455/63.4 |
| 2016/0294591 A1* | 10/2016 | Kurchuk | H04B 1/06 |
| 2016/0329631 A1* | 11/2016 | Rheinfelder | H01Q 1/246 |
| 2017/0041038 A1* | 2/2017 | Kirkpatrick | G01S 13/02 |
| 2017/0085005 A1* | 3/2017 | Aue | H04B 1/40 |
| 2017/0150317 A1* | 5/2017 | Iun | H04W 4/025 |
| 2017/0346575 A1* | 11/2017 | Tang | H04B 7/0617 |
| 2017/0346664 A1* | 11/2017 | Barghi | H04L 27/0002 |

* cited by examiner

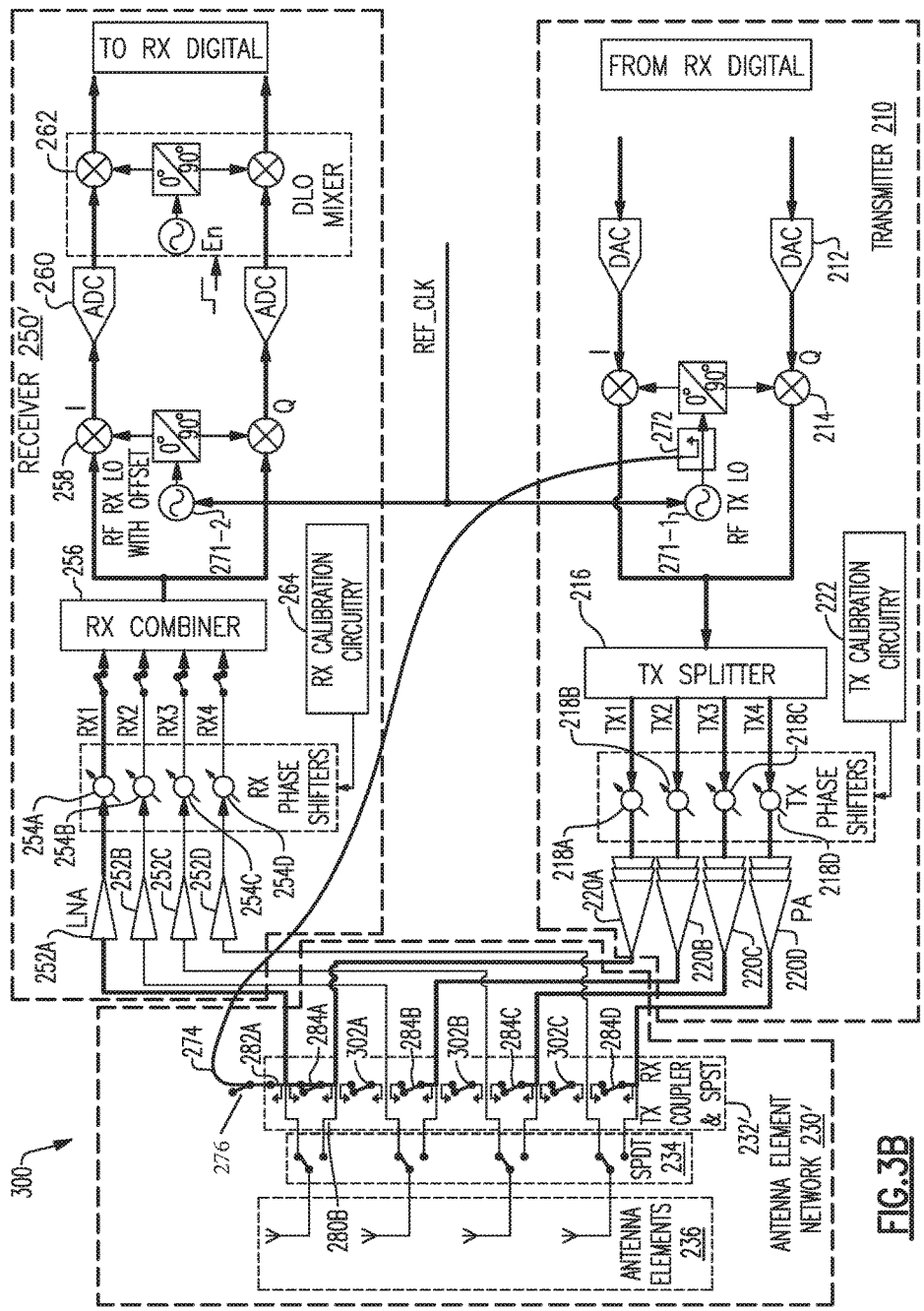

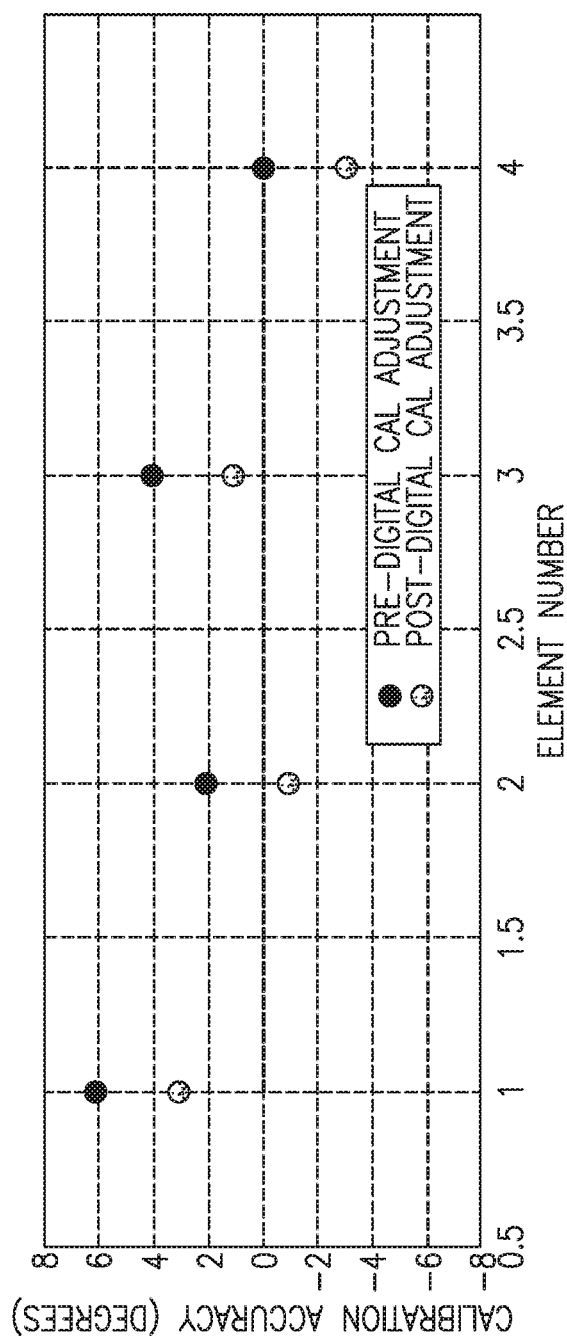

ACTIVE ANTENNA CALIBRATION

FIELD OF DISCLOSURE

The present disclosure relates to calibrating an active antenna system.

BACKGROUND

An antenna array can transform electromagnetic signal into electromagnetic waves that broadcast a radiation pattern and/or produces an electrical signal in response to receiving electromagnetic waves. This radiation pattern can be used to transmit and receive signals.

The performance of an antenna array typically depends on several factors, such as array size, transceiver architecture, assembly methods, availability of a common reference point, and matching, and calibration. Transmit and/or receive alignment, such as on phase and/or amplitude, can affect the transmitter and/or receiver radiation pattern. Accordingly, it is typically desirable to have accurate transmit and receive calibration in an active antenna system.

SUMMARY OF THE DISCLOSURE

The innovations described in the claims each have several aspects, no single one of which is solely responsible for its desirable attributes. Without limiting the scope of the claims, some prominent features of this disclosure will now be briefly described.

One aspect of this disclosure is an integrated circuit for active antenna calibration. The integrated circuit can include receive paths including a first receive path. The first receive path can include at least a portion of a signal path between a first active antenna element and a first mixer. The integrated circuit can include transmit paths including a first transmit path. The first transmit path can include at least a portion of a signal path between the first active antenna element and a second mixer.

The integrated circuit can further include a signal distribution circuit configured to couple a local oscillator (LO) signal to the first receive path and to couple a transmit signal from the first transmit path to the first receive path.

The integrated circuit can further include calibration circuitry configured to generate a first calibration coefficient for the first receive path based on the LO signal, and generate a second calibration coefficient for the first transmit path based on a signal propagating through the first transmit path and the first receive path.

The calibration circuitry can further be configured to generate a third calibration coefficient for a second receive path based on a signal propagating through the first transmit path and the second receive path.

The signal distribution circuit can further be configured to couple the LO signal to a second receive path and to couple the transmit signal from a second transmit path to the second receive path.

The first transmit path can comprise a phase shifter and the calibration circuitry can be configured to provide the second calibration coefficient to the phase shifter to cause a phase associated with the first transmit path to be adjusted.

The calibration circuitry can be configured to generate the first calibration coefficient based on a least-means-squared algorithm.

The signal distribution circuit can comprise a coupler and a switch coupled between a transmit local oscillator and the first receive path.

The signal distribution circuit can comprise a switch configured to couple the transmit signal from the first transmit path to the first receive path.

The signal distribution circuit can further comprise a splitter coupled between the switch and each of the receive paths, receive path couplers coupled between the splitter and respective receive paths, and matched traces electrically connecting the splitter to respective receive path couplers.

Another aspect of this disclosure is an active antenna system with active antenna calibration. The active antenna system can comprise integrated circuits each configured to receive a matched clock signal, the integrated circuits comprising a first integrated circuit. The first integrated circuit can comprise receive paths including a first receive path, the first receive path including at least a portion of a signal path between a first active antenna element and one or more analog-to-digital converters, transmit paths including a first transmit path, the first transmit path including at least a portion of a signal path between the first active antenna element and one or more digital-to-analog converters, a signal distribution circuit configured to couple a transmit local oscillator (LO) signal to the first receive path; and calibration circuitry configured to generate a calibration coefficient for the first receive path based on the transmit LO signal.

The active antenna system can further comprise a local oscillator signal distribution circuit configured to distribute the matched clock signal to each of the integrated circuits.

The calibration circuitry can further be configured to generate a second calibration coefficient for the first transmit path based on a signal propagating through the first transmit path and the first receive path.

The signal distribution circuit can further be configured to couple a transmit signal from the first transmit path to the first receive path.

Another aspect of this disclosure is a method for active antenna calibration. The method can comprise calibrating a first signal path based on a local oscillator (LO) signal, the first signal path including at least a portion of a signal path between a first active antenna element and a digital circuitry, coupling a portion of a transmit signal from a second signal path to the first signal path, the second signal path including at least a portion of a signal path between the first active antenna element and the digital circuitry, and calibrating the second signal path relative to the first signal path based on the portion of the transmit signal.

The first signal path can include a receive path, the second signal path can include a transmit path, and the LO signal can be coupled to the first signal path from a transmit local oscillator.

The method can further comprise calibrating a third signal path based on the LO signal, the third signal path including at least a portion of a signal path between a second active antenna element and the digital circuitry, and calibrating a fourth signal path relative to the third signal path, the fourth signal path including at least a portion of the signal path between the third active antenna element and the digital circuitry.

The method can further comprise coupling the LO signal to the first signal path using a switch and a coupler coupled between an LO and the first signal path.

A first trace in an electrical connection between the switch and the first signal path can be matched with a second trace in an electrical connection between the switch and another path.

The method can further comprise coupling a third signal path to the second signal path, and calibrating the third signal path relative to the second signal path, the third signal path including at least a portion of a signal path between a second active antenna element and the digital circuitry.

Calibrating the first signal path can comprise connecting the first signal path to the digital circuitry while disconnecting at least another path from the digital circuitry; and calibrating the second signal path can comprise coupling the first signal path with second signal path while disconnecting the first signal path with at least another path.

Calibrating the first signal path can comprise adjusting a first phase shifter, and calibrating the second signal path can comprise adjusting a second phase shifter.

Calibrating the further signal path can further comprise performing a digital phase adjustment with the digital circuitry The first phase shifter can include at least one of: an analog phase shifter or a digital phase shifter. Calibrating the first signal path can comprise a digital adjustment. Calibrating the second signal path can comprise a digital adjustment.

The method can further comprise, prior to calibrating the first signal path, coupling a local oscillator that generates the LO signal with the first signal path.

The digital circuitry can comprise at least one of: shared circuitry configured to process signals associated with a first signal path and a second signal path, or separate circuitry configured to process signals associated with a first signal path than circuitry configured to process signals associated with a second signal path.

The method can further comprise identifying a failure based on said calibrating the second signal path; and performing a mitigating action in response to said identifying.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIG. 3B is a schematic diagram of an active antenna calibration system of FIG. 3A in different state than shown in FIG. 3A.

FIG. 4D is a graph illustrating measurements of calibration accuracy for pre-digital calibration adjustment and post-digital calibration adjustment according to an embodiment.

DETAILED DESCRIPTION

Figure 1A:
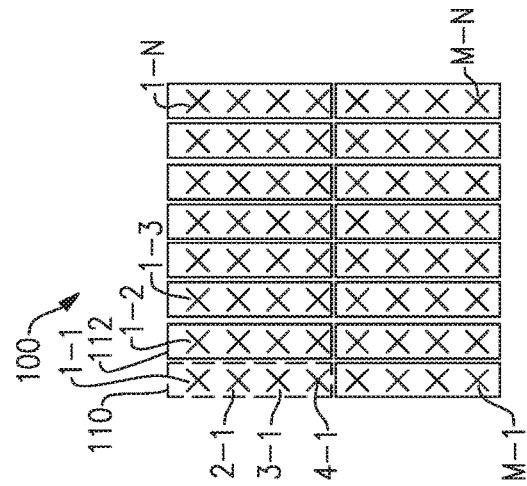
FIG. 1A is a schematic diagram of an active antenna array.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

An active antenna calibration system can include a transceiver with calibration actuator(s) configured to calibrate the receive path and/or the transmit path of the transceiver. Active antenna arrays can toggle between transmit and receive modes. Such active antenna arrays can be implemented in a variety of systems, such as infrastructure base stations or radar applications. Active antennas can use phase shifters in transmit and/or receive paths to control the radiation pattern of the active antenna and the receive parameters. Shifting the phase of a signal can provide benefits to the active antenna. For example, shifting the phase of a transmit signal can enable the active antenna to steer beam patterns in certain directions. The active antennas can also steer away from less desirable directions. The directivity of the active antennas can increase, thus increasing the range of radars, improving signal-to-interference ratios, overall network capacity, the like, or any combination thereof.

An active antenna can shift the radiation pattern by controlling the phase of transmitted signals. For example, the phase shifters can delay the radio waves gradually such that the signals emitted from the active antenna create a plane wave that propagates in a specific direction. By controlling the phase shifters, the active antenna can change the direction of the plane wave. The phase shifters can be adjusted in one dimension such that the radiation pattern can be steered in one dimension. In some embodiments, the phase shifters can be adjusted in two-dimensions such that the radiation pattern can be steered in two dimensions. Furthermore, accuracy of the receiver depends on, among other things, the relative alignment of the receivers, such that the received signals are combined with deterministic and accurate phase offset.

Calibration, such as phase alignment calibration and/or amplitude calibration, of active antenna systems has been a major technical challenge in the deployment of active antenna systems. Moreover, various calibration solutions are costly to implement and can involve significant additional hardware specifically for implementing calibration. Certain calibration mechanisms are premised on all signals be routed to a common reference point to optimize the accuracy of the calibration. However, such signal routing can place significant constraints on trace matching and/or can add aggressive specifications for factory calibrations. This disclosure provides technical solutions that can efficiently implement calibration of active antennas. Aspects of this disclosure relate to local calibration of transceivers that can accomplish accurate calibration without using a common reference point between transceivers to achieve calibration between signal paths of different transceivers. The local calibration can be implemented on an individual integrated circuit of an active antenna system. With local calibration, active antenna calibration can be implemented without a common reference point.

A transmit path can be calibrated such that a transmit signal consistently reaches an antenna element with a deterministic and accurate phase offset. When all transmit signals are in phase, then a radiative beam can be generated which is pointing at boresight. Engineering a relative phase offset between the transmit elements (e.g., by beamforming) can cause a radiative beam to be pointed in a pre-determined direction.

A receive path can be calibrated such that received signals from all elements are combined with a deterministic and accurate phase offset. Receive beamforming can be applied similarly to transmit beamforming.

Calibration can involve phase calibration, amplitude calibration, latency calibration, the like, or any suitable combination thereof. In certain applications, phase calibration can have the most significant impact on radiation performance of an active antenna array. Phase misalignment can be the most challenging aspect of calibration in a variety of applications. Accordingly, this disclosure may focus on phase calibration. However, any suitable principles and advantages discussed herein can be implemented in association with other types of calibration, such as amplitude calibration or latency calibration.

Calibration is often done in the presence of a beamformer. A calibration actuator can be implemented separately from a beamformer. In some instances, the functionality of a calibration actuator and a beamformer can be implemented together using common circuitry.

Trace matching can be unavoidable for calibration in certain applications. It can be desirable to have relatively less stringent trace matching and still achieve a desired level of calibration. For calibration, a tradeoff often exists between radio frequency (RF) front-end design complexity and digital signal processing (and/or software and/or firmware) in the back-end. Cumulative errors can also be problematic and can be minimized. Calibration solutions may also involve hardware partitioning, impacting integrated circuit architecture and influencing the calibration solution. Furthermore, some calibration solutions involve enabling and disabling of a data link (i.e., stopping transmission or reception of signals during calibration).

Aspects of this disclosure relate to technical solutions that can alleviate such constraints on the active array system, among others. Embodiments discussed herein relate to calibration based on a clock reference signal that is matched across integrated circuits of an active antenna system, such as an active antenna array. In certain embodiments, calibration is performed in stages, where a first signal path relative misalignment is measured in a first stage, and a second signal path relative misalignment is measured in a second stage. For example, a first receive path relative misalignment can be first measured in a first stage. Then, a first transmit relative misalignment path is measured relative to the first receive path in a second stage using signals propagating through the first receive path and the first transmit path. Some embodiments relate to misalignment measurement performed on the receive path in the first stage and a transmit path in a subsequent stage. However, calibration and/or misalignment measurement can also be performed in any suitable order. For instance, in some applications misalignment measurement can be performed on the transmit path in the first stage and a receive path in a subsequent stage. In active antenna calibration techniques discussed herein that are based on clock reference signals being matched across integrated circuits, the active antenna array system can implement accurate misalignment measurement and/or calibration of among signal paths on different integrated circuits without a common reference point. Furthermore, such misalignment measurement and calibration can allow for seamless scalability of the active antenna array. For example, an 8×8 active antenna may be scaled up to 16×16 by using more of the same integrated circuits that each receive a matched clock reference signal.

Relative misalignment measurement of a first receive path can be achieved in accordance with aspects of this disclosure. The misalignment measurement of the first receive path in the first stage can include injecting a signal into the first receive path. For example, a local oscillator signal can be injected into the first receive path. The receive path can be between an antenna element and digital circuitry, such as at a digital signal processor. In some embodiments, digital circuitry can include shared circuitry to process signals associated with multiple signal paths. In some embodiments, digital circuitry can include dedicated circuitry to process signals associated with one path and separate dedicated circuitry to process signals associated with another path. In some embodiments, digital circuitry can include partially embedded circuitry to process signals associated with one path and partially embedded circuitry to process signals associated with multiple paths.

In certain embodiments, the local oscillator signal can be coupled to a multi-throw switch on a receive side opposite an antenna side. For instance, the multi-throw switch can be a single-pole, double-throw (SPDT) switch, where the SPDT switch is connected to an antenna element on the antenna side. The local oscillator signal can propagate in the receive path to a digital signal processor. The digital signal processor can measure a phase of the received signal. The local oscillator signal can propagate through circuit elements before being measured by the digital signal processor (e.g., a low noise amplifier, a phase shifter, a switch, a receiver combiner, an IQ mixer, a data converter such as an analog-to-digital converter, a digital local oscillator mixer, the like, or any suitable combination thereof). Based on the measured signal at the digital signal processor, the calibration circuit can calibrate a calibration actuator by calculating and applying a calibration coefficient, such as applying the coefficient to a phase shifter, for the receive path. For example, if the expected phase is different from the actual phase measurement of the received signal, then the digital receiver can adjust the phase shifter according to the difference.

In some embodiments, misalignment measurement and/or calibration can be performed on multiple receive paths using the same local oscillator signal. A local oscillator signal can be injected into multiple receive paths, such as a first receive path, a second receive path, a third receive path, and a fourth receive path). The receive paths can be connected to a single digital signal processor. The active antenna calibration system can control which receive path of the receive paths is connected to the digital signal processor, such as by using switches. Connecting one receive path at a time to the digital signal processor, the active antenna calibration system can take measurements associated with each of the receive paths using the same local oscillator signal injected into the receive paths. Based on the misalignment measurements, the integrated circuit can calibrate the receive paths relative to each other.

Aspects of this disclosure relate to calibration of a first transmit path based on a previously-calibrated first receive path. After a first receive path is calibrated, the system can calibrate the first transmit path relative to the first receive path. The active antenna calibration system can transmit a signal from the first transmit path and couple the first transmit path to the first receive path such that the signal propagates from the first transmit path to the first receive path, the first receive path that was previously calibrated. The coupling can occur from a location in close physical proximity to the antenna elements. After the transmitted signal is coupled from the first transmit path to the first receive path, the digital signal processor can measure the coupled signal. Because the first receive path was already previously calibrated (e.g., by measuring the injected local oscillator signal), the active antenna calibration system can isolate the misalignment measurement to the first transmit path, even though the signal propagates in both the first receive path and the first transmit path. The active antenna calibration system can transmit a signal that propagates through the first transmit path (e.g., an IQ mixer, a transmit splitter, a transmit phase shifter, a power amplifier), to the coupler that couples the signal from the first transmit path to the first receive path, through the first receive path (e.g., a low-noise amplifier, a receive phase shifter, a switch, a receive combiner, an IQ mixer, an analog-to-digital converter, and/or a digital local oscillator mixer), and measured by the digital circuit (e.g., the signal propagates through a signal converter (such as a digital-to-analog converter).

The transmitter of the active antenna calibration system can include a splitter that splits a signal that propagates to several transmit paths, such as the first transmit path, the second transmit path, the third transmit path, and the fourth transmit path. The active antenna calibration system can selectively electrically couple signals to the receive path using a coupler switch. For example, one of the signals transmitted from the splitter can be coupled to a receive path, and the coupled signal can be received and measured by the digital signal processor. The other signals transmitted from the splitter to the other transmit paths may not propagate to receive paths if the associated coupler switch is open (e.g. if the transmit path and the receive path are disconnected). Based on the measured signal, the active antenna calibration system can calibrate the transmit path by determining, accessing, calculating, applying, and/or adjusting a calibration coefficient, such as by applying the calibration coefficient to the phase shifter associated with the transmit path.

Aspects of this disclosure relate to calibration of a signal path that can be connected to a second antenna element based on a calibrated signal path connected to a first antenna element. For example, a first transmit path connected to a first antenna element can be calibrated. Then, a first transmit path configured to be connected to a first antenna element can be coupled to a second receive path configured to be connected to a second antenna element. Then, a signal is transmitted and propagates through the first transmit path, couples to the second receive path, and measured by the digital receiver of the second receive path. A second receive path connected to a second antenna element can then be calibrated based on a signal transmitted from a first transmit path because the first transmit path has already been calibrated. The digital signal processor can measure the signal that propagated through the first transmit path and the second receive path, and isolate the calibration to the phase of the second receive path because the first transmit path had already been calibrated. In certain embodiments, data throughput does not have to be interrupted for calibration (e.g., data transmitted to the antenna element via a transmit path can be coupled to a receive path for calibration, such that the data transmission does not have to be interrupted).

While embodiments of this disclosure may be discussed with reference to adjusting a phase associated with a receive path or a transmit path, any suitable principles and advantages discussed herein can be implemented in connection with adjusting amplitude of a receive signal path and/or a transmit signal path.

Active Antenna Calibration System with a Receive Calibration Actuator and a Transmit Calibration Actuator Illustrative calibration systems with calibration actuators in respective receive paths and transmit paths will now be described. Such systems can have improved phase calibration for active antenna systems. While some embodiments may be described with reference to devices being active antenna systems, the principles and advantages discussed herein can be applied to any suitable devices arranged to transmit and/or receive a signal that could benefit from improved phase calibration.

FIG. 1A is a schematic diagram of an active antenna system 100 according to an embodiment. The active antenna system 100 can be a multi-element antenna array, such as a one dimensional array, two dimensional array, or the like. The embodiment of FIG. 1A illustrates an 8×8 active antenna system 100. The antenna elements in one dimension are identified as 1-1, 1-2, to 1-N. The antenna elements in a second dimension are identified as 1-1, 2-1, to M–1. Thus, the active antenna array can be comprised of M-N antenna array elements, in which M and N are positive integers. The active antenna calibration system 100 can include integrated circuits (ICs), such as a first IC 110 and a second IC 112. Each IC can include a plurality of antenna elements and associated components (such as radio frequency components). For example, the first IC 110 can include antenna array elements 1-1, 2-1, 3-1, 4-1. The active antenna system 100 of FIG. 1A illustrates ICs that each can include 4 antenna elements.

Figure 1B:
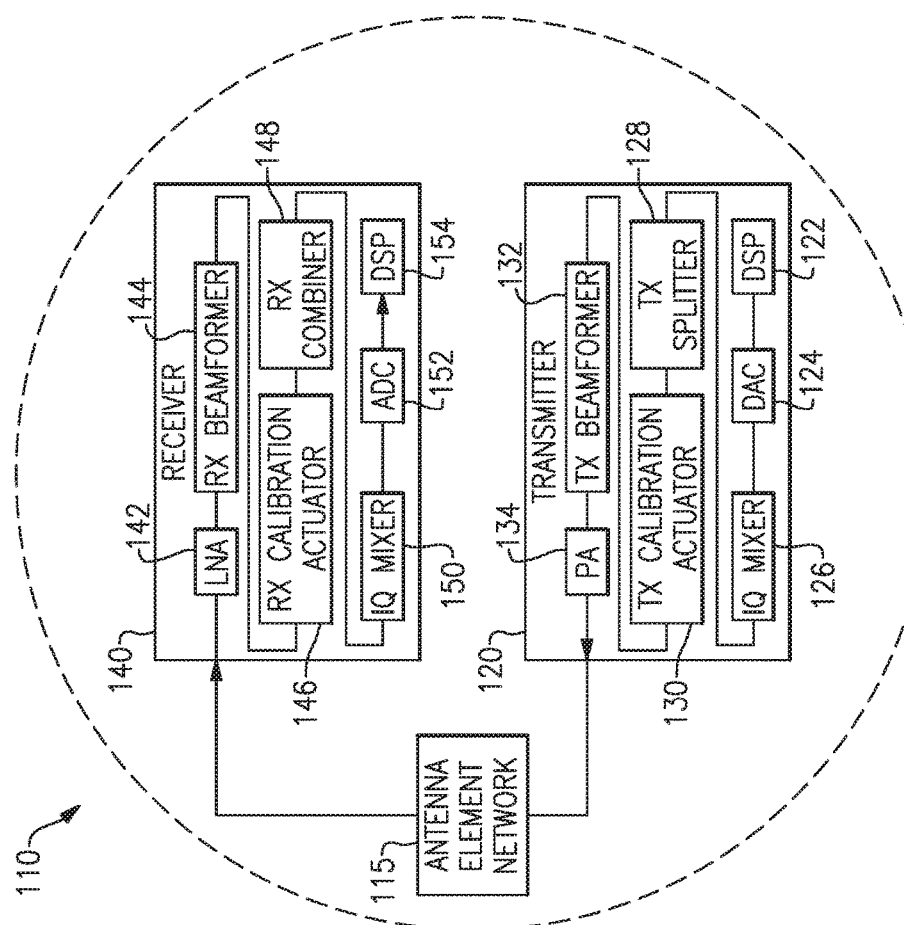
FIG. 1B is a schematic diagram of an integrated circuit of the antenna array of FIG. 1A that includes a receiver calibration actuator and a transmitter calibration actuator according to an embodiment.

FIG. 1B is a schematic diagram of an IC 110 of the active antenna array of FIG. 1A that includes a receiver calibration actuator and a transmitter calibration actuator according to an embodiment. The IC 110 of FIG. 1B includes an antenna element network 115, a transmitter 120, and a receiver 140. The antenna element network 115 can include antenna elements of an IC (such as antenna elements 1-1, 2-1, 3-1, and 4-1 of the first IC 110 of FIG. 1A). The transmitter 120 can include components that condition a signal for transmission. In IC 110 of FIG. 1B, the transmitter 120 includes a digital signal processor (DSP) 122, a digital-to-analog converter (DAC) 124, an IQ Mixer 126, a transmit path splitter (TX Splitter) 128, a transmit calibration actuator (TX Calibration Actuator) 130, a transmit beamformer (TX Beamformer) 132, and a power amplifier (PA) 134. A transmit path can include at least a portion of the components within the transmitter 120. A transmit path can include other components found in other systems or components (e.g., components included in the antenna element network 115 such as a switch). For example, a transmit path can include a portion of a signal path between an active antenna element and digital circuitry. In some embodiments, a transmit path can include a portion of a signal path between an active antenna element and a mixer. The transmit calibration actuator 130 and the receive calibration actuator 146 are shown to be separate from the beamformer, but can be an integrated solution. In some instances, transmit paths are calibrated so as to align to each other and receive paths are calibration so as to align to each other.

The receiver 140 can include components that condition a signal for receipt at a digital receiver and/or components that condition the signal for measurement. For example, the receiver 140 can include a low noise amplifier (LNA) 142, a receive beamformer 144, a receive calibration actuator (Rx Calibration Actuator) 146, a receive combiner (Rx Combiner) 148, an IQ Mixer 150, an analog-to-digital converter (ADC) 152, and a digital signal processor 154. The receive path can include components of the antenna element network 115, such as a switch. The receive path can include digital components, such as a digital local oscillator mixer. For example, a receive path can include a portion of a signal path between an active antenna element and digital circuitry. In some embodiments, a receive path can include a portion of a signal path between an active antenna element and a mixer. According to some other embodiments discussed herein, the transmitter 120 and/or the receiver 140 can include other components. The transmitter 120 and/or receiver 140 can include a subset of the components as shown in FIG. 1B, but arranged differently. In certain embodiments, at least two ICs (e.g., first and second ICs 110, 112, respectively, of FIG. 1A) can receive substantially the same reference clock REF_CLK, such that the ICs are calibrating based on the same reference signal.

Active Antenna System with Calibration of a Transmit Path of an Integrated Circuit Based on a Calibrated Receive Path Illustrative integrated circuits of an active antenna system with calibration will now be described. Such integrated circuits can be implemented in any of the active antenna arrays discussed herein. Any circuit blocks of the integrated circuits can be implemented in accordance with any suitable principles and advantages of other circuit blocks of the integrated circuits discussed herein.

Figure 2A:
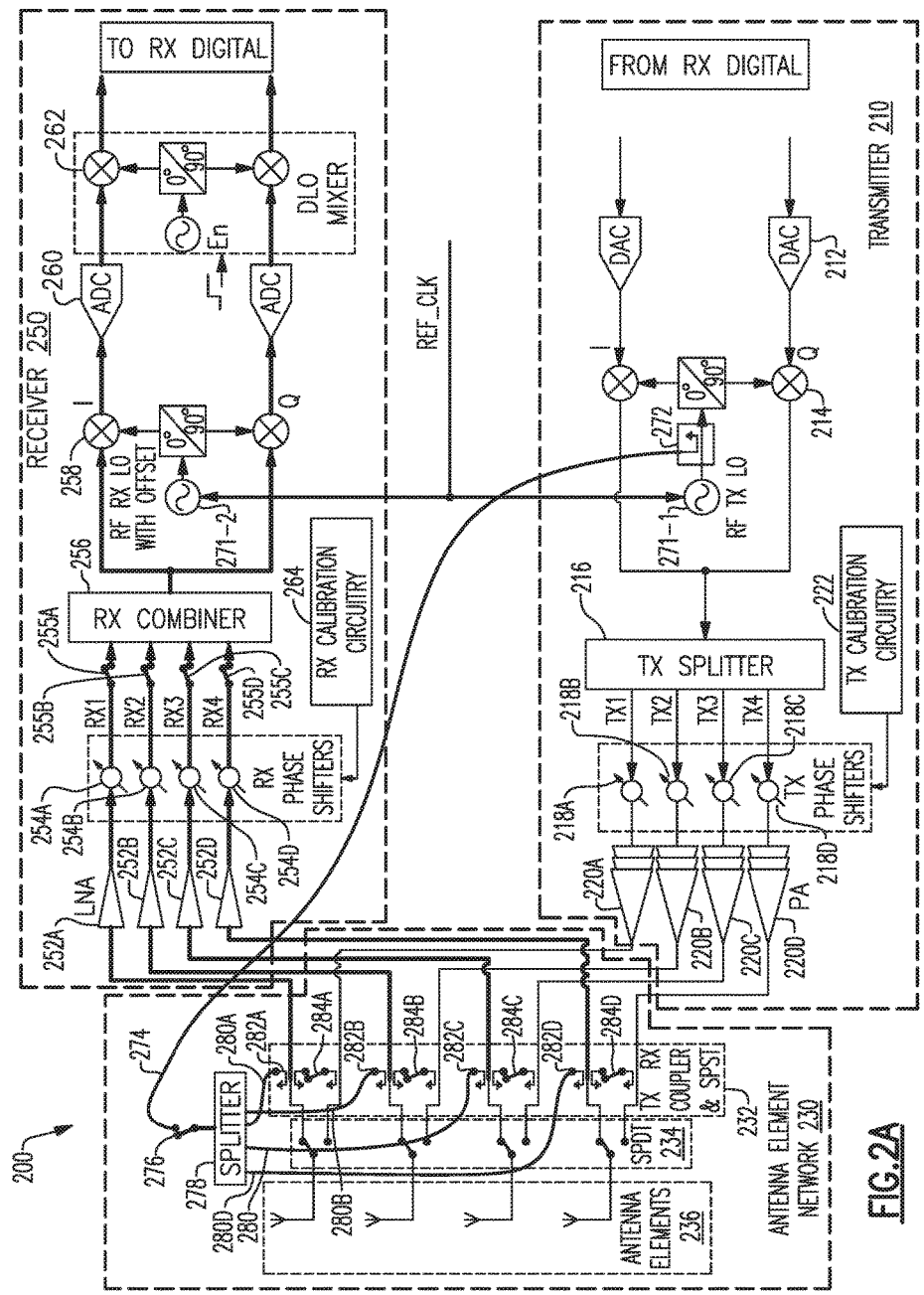
FIG. 2A is a schematic diagram of an active antenna system according to an embodiment.

FIG. 2A is a schematic diagram of an integrated circuit 200 of an active antenna system according to an embodiment. The integrated circuit 200 is an example of the first IC 110 of FIG. 1A and/or 1B and can be implemented in accordance with any suitable principles and advantages discussed herein. The integrated circuit 200 can include calibration circuitry configured to generate a first calibration coefficient for a receive path based on a local oscillator signal, generate a second calibration coefficient for a transmit path based on a signal propagating through the transmit path and the receive path. The calibration circuitry can include the transmit calibration circuitry 222 and the receive calibration circuitry 264 illustrated in FIG. 2A.

The integrated circuit 200 can include a transmitter 210. The transmitter 210 transmits a signal from a digital signal processor to other components of the system. In some embodiments, the transmitter 210 includes a DAC 212, an IQ Mixer 214, a TX splitter 216, TX phase shifters 218A to 218D, and power amplifiers 220A to 220D. The transmitter 210 can include a plurality of transmit paths (e.g., a first transmit path, a second transmit path, a third transmit path, a fourth transmit path). The first transmit path can include the DAC 212, the IQ Mixer 214, the TX splitter 216, the TX phase shifter 218A, and the power amplifier 220A. The second transmit path can include the DAC 212, the IQ Mixer 214, the TX splitter 216, the TX phase shifter 218B, and the power amplifier 220B. The third transmit path can include the DAC 212, the IQ Mixer 214, the TX splitter 216, the TX phase shifter 218C, and the power amplifier 220C. The fourth transmit path can include the DAC 212, the IQ Mixer 214, the TX splitter 216, the TX phase shifter 218D, and the power amplifier 220D. In some embodiments, some transmit paths may share certain elements (e.g. the DAC 212, the IQ Mixer 214, and the TX Splitter 216). In some embodiments, some transmit paths may not share any elements. A signal transmitted from the digital signal processor can be converted to a radio frequency signal via the DAC 212. The illustrated DAC 212 can be implemented by one or more DACs. For instance, the DAC 212 can be implemented by a DAC shared among transmit paths. As another example, the DAC 212 can include a number of DACs, such as separate DACs corresponding to different power amplifiers. Then, the frequency of the signal can be adjusted using the IQ Mixer 214. The signal can be split into a plurality of transmit paths using a TX splitter 216. The split signals can then be phase shifted via transmit phase shifters 218A, 218B, 218C, 218D (collectively referred to herein as transmit phase shifters 218). Then, the signal can be amplified using power amplifiers 220A, 220B, 220C, 220D (collectively referred to herein as power amplifiers 220). The transmitter 210 can include a transmit calibration circuitry 222 to compute a calibration coefficient for a transmit path. The transmit calibration circuitry 222 can compute the calibration coefficient based on a transmit signal from the transmit path propagating through a receive path of the receiver 250. The transmit calibration circuitry 222 can be implemented by dedicated circuitry in certain applications. The transmit calibration circuit 222 can be implemented by a digital signal processor configured to process signals from the transmit paths or from the transmit and receive paths in some applications.

The integrated circuit 200 can also include an antenna element network 230. The antenna element network 230 provides the signal from the transceiver to the antenna elements. In some embodiments, the antenna element network 230 includes a transmit-to-receive coupler single-pole, single-throw (SPST) switch 232, an SPDT switch 234, and antenna elements 236. The signals can be coupled from the transmit path to the receiver path using a transmit-to-receive coupler SPST switch 232. For example, a switch 284A, 284B, 284C, or 284D (collectively referred to hereinafter as 284) can be used to couple a transmit path to a receive path. The antenna element network 230 can include a coupler connected to one path such as a transmit path, a coupler connected to another path such as a receive path, and a switch 284 connecting the two couplers to allow coupling of the signal from a transmit path to a receive path. Furthermore, a coupler 282A, 282B, 282C, or 282D can be used to inject a signal into a receive path. The SPDT switch 234 can selectively electrically couple the antenna elements 236 to the transmitter 210 or to the receiver 250.

The integrated circuit 200 can include a receiver 250. The receiver 250 receives a signal to be sent to a digital signal processor. In some embodiments, the receiver 250 can include several receive paths. For example, the receiver 250 can include LNAs 252A-D, receive phase shifters 254A-D, switches 255A-D, a Rx combiner 256, an IQ mixer 258, an ADC 260, and a digital local oscillator mixer 262 (DLO Mixer). The illustrated ADC 260 can be implemented by one or more ADCs. For instance, the ADC 260 can be implemented by an ADC shared among receive paths. As another example, the ADC 260 can include a number of ADCs, such as separate ADCs corresponding to different LNAs. The first receive path can include an LNA 252A, Rx phase shifter 254A, a switch 255A, the RX combiner 256, the IQ Mixer 258, the ADC 260, and the DLO Mixer 262. The second receive path can include an LNA 252B, the Rx phase shifters 254B, the switch 255B, the RX combiner 256, the IQ Mixer 258, the ADC 260, and the DLO Mixer 262. The third receive path can include an LNA 252C, the Rx phase shifters 254C, the switch 255C, the RX combiner 256, the IQ Mixer 258, the ADC 260, and the DLO Mixer 262. The fourth receive path can include an LNA 252D, the Rx phase shifters 254D, the switch 255D, the RX combiner 256, the IQ Mixer 258, the ADC 260, and the DLO Mixer 262.

In some embodiments, the receive paths may share certain components (e.g. RX Combiner 256, IQ Mixer 258, ADC 260, and a DLO Mixer 262). In some embodiments, some receive paths may not share any elements. A radio frequency signal can be received by the receiver 250, and amplified by a low-noise amplifier 252A, 252B, 252C, 252D (collectively referred to herein as low noise amplifiers 252). Then, the radio frequency signal phase can be shifted using a receive phase shifter 254A, 254B, 254C, 254D (collectively referred to herein as receive phase shifters 254). Then, a system of switches 255A, 255B, 255C, 255D (collectively referred to herein as switches 255) can determine which of the signals are sent to the digital signal processor. A receive combiner can combine the signals that have closed switches 255 (e.g., if switch 255A is closed while switches 255B, 255C, 255D are open, then the switch 255A passes the RF signal to the digital signal processor) using a RX combiner 256. The frequency of the radio frequency signal can be shifted using the IQ mixer 258. The downconverted signal provided by the IQ mixer 258 can be converted to a digital signal using an analog-to-digital converter 260.

In some embodiments, a digital signal from the analog-to-digital converter 260 can be conditioned before being provided to the digital signal processor (e.g., using a digital local oscillator mixer 262 to adjust the frequency of the digitized signal). The digital signal processor can take measurements of the signal (e.g., measurements of phase). The receiver 250 may include a receive calibration circuitry 264 to compute a calibration coefficient for a receive path. The receive calibration circuitry 264 can compute the calibration coefficient based on local oscillator signal propagating through the receive path. The receive calibration circuitry 264 can be implemented by dedicated circuitry in certain applications. The receive calibration circuitry 264 can be implemented by a digital signal processor configured to process signals from the transmit paths or from the transmit and receive paths in some applications.

The integrated circuit 200 can include components to inject a predetermined signal (e.g., a local oscillator signal) into one or more receive paths using a signal distribution circuit. The signal distribution circuit may include couplers 272, 282A, 282B, 282C, 282D, cables 274, 280A, 280B, 280C, 280D, switches 276, 284A, 284B, 284C, 284D, and a splitter 278. The signal distribution circuit of the integrated circuit 200 can receive a reference clock REF_CLK. This reference clock REF_CLK can be sent to each of the integrated circuits. For example, a synchronized reference clock REF_CLK can be sent to each of the integrated circuits 110 in the active antenna calibration system 100 of FIG. 1A. Such a synchronized reference clock can be implemented in accordance with any of the principles and advantages discussed in U.S. patent application Ser. No. 15/147,408 tiled "Apparatus and Methods for Phase Synchronization of Phase Locked Loops," U.S. Pat. No. 9,503,109 titled "Apparatus and Methods for Synchronizing Phase Locked Loops," and/or U.S. patent application Ser. No. 14/954,857 titled "Apparatus and Methods for Phase Synchronization of Local Oscillators in a Transceiver," the technical disclosures of each of which are hereby incorporated by reference in their entireties herein. The methods of calibration discussed herein can utilize the synchronization of the synchronized reference clock across a plurality of different ICs in calibrating transmit and receive paths among different ICs.

The reference clock REF_CLK, or a signal derived from the reference clock REF_CLK, can be injected into the receive paths. In some embodiments, the reference clock REF_CLK is sent to a radio frequency transmit local oscillator (RF TX LO) 271-1 and a radio frequency receive to generate a local oscillator (RF RX LO) 271-2. The RF RX and TX LOs 271-1, 271-2 can send a local oscillator signal to the IQ mixer 214, 258 of the transmitter 210 and the receiver 250 respectively. In some embodiments, the local oscillator signal can be coupled by a coupler 272 to components that inject the local oscillator signal, or a signal derived from the local oscillator signal, into the receive paths. For example, the local oscillator signal of the transmitter can be coupled by the coupler 272, can propagate by a cable 274, can be split by a splitter 278, can propagate to receive paths through cables 280A, 280B, 280C, 280D (collectively referred to herein as cables 280), and coupled to the receive paths using couplers 282A, 282B, 282C, 282D (collectively referred to herein as 282). In some embodiments, a switch 276 can be used to control whether the local oscillator signal is injected into the receive paths.

The signal trace between the local oscillator (e.g., RF TX LO 271-1) and one receive path should be matched to the signal trace between the local oscillator (e.g., RF TX LO 271-1) and another receive path for optimal performance. For example, the signal trace in an electrical connection between the splitter 278 and the couplers 282 should be matched (e.g., the signal trace between switch 278 and coupler 282A is matched to the signal trace between switch 278 and coupler 282B) for optimal performance. The signal trace in an electrical connection between the switch 278 and the couplers 282 can be matched between integrated circuits of the active antenna calibration system 100. The signal trace in an electrical connection between the coupler 272 and the switch 276 can be matched between integrated circuits of the active antenna calibration system 100 (e.g., the signal trace to the first IC 110 is matched with the signal trace to the second IC 112). In some embodiments, a coupler may couple a signal to a signal path. A directional coupler may be used. For example, a directional coupler with four ports that can couple a signal propagating from an input port to a transmitted port by coupling the signal to a coupled port, can be used. Such a directional coupler can have an isolated ported connected to ground by way of a termination impedance.

FIG. 2A illustrates a schematic diagram in which the integrated circuit 200 is in a state for calibrating the first receive path. In this state, an REF_CLK is sent to the integrated circuit 200. The RF TX LO 271-1 receives the REF_CLK and generates a local oscillator signal. In some embodiments, a signal path is calibrated across ICs of the active antenna calibration system 100 (e.g., the first receive path of the first IC 110 is calibrated and the first receive path of the second IC 112 is also calibrated).

Figure 2B:
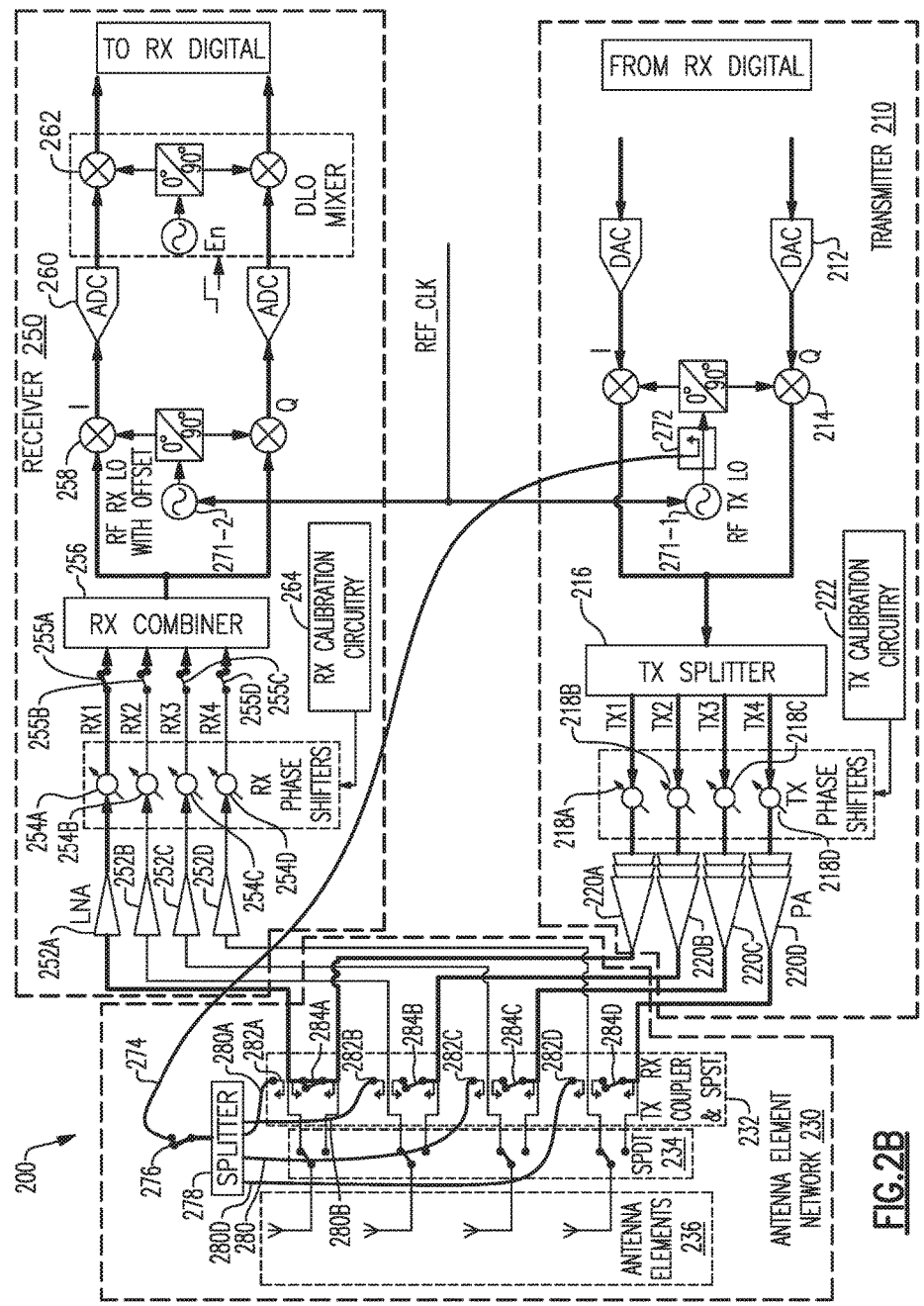
FIG. 2B is a schematic diagram of the active antenna system of FIG. 2A in a different state than shown in FIG. 2A.

In certain embodiments, the local oscillator signal is coupled to the cable 274 via the coupler 272, propagates though the cable 274 to the switch 276, propagates through the closed switch 276 to the splitter 278, and is split by the splitter 278. In this example, the SPST switches of the transmit-to-receive coupler SPST switch 232 are open. Each of the split local oscillator signals are sent to the receive paths, via cables 280, respectively. Each of the split local oscillator signals are amplified by the LNAs 252 and phase shifted by the phase shifters 254. As illustrated, the switch 255A can be closed while the other switches 255B, 255C, 255D are open. Then, the local oscillator signal for the first receive path is sent to the RX combiner 256, which is then mixed using the IQ mixer 258, converted to a digital signal using the ADC 260, and conditioned using the digital signal processor (e.g., mixed by a digital LO Mixer 262). The IQ mixer 258 can use the same reference clock REF_CLK used to generate the local oscillator signal from the transmit local oscillator 271-1 that is injected into the receive paths. This process can be repeated for the other receive paths by closing and opening the switches 255 accordingly (e.g., for the second receive path, the second switch 255B is closed while the other switches 255A, 255C, and 255D are open). Then, based on the measured signals by the digital signal processor, the receive paths can be calibrated. For example, the phase differences between the receive paths can be determined, and the phase shifters 254 can be adjusted accordingly. For example, the measurement of the signal propagating through the first receive path can be a reference measurement to be used to calibrate one or more other receive paths, such that the one or more other receive paths are calibrated to the first receive path. In some instances, all of the other receive paths can be calibrated to the reference receive path. To achieve optimally aligned timing between ICs, the trace from an input contact (e.g., a pin) configured to receive the reference clock REF_CLK to local oscillator 271-2 should be aligned on all IC's of an active antenna system. Similarly, the trace from the input contact (e.g., a pin) configured to receive the reference clock REF_CLK to local oscillators 271-1 should be aligned on all IC's of the active antenna system to achieve optimal timing alignment between ICs FIG. 2B is a schematic diagram of the IC 200 of FIG. 2A in a different state. In FIG. 2B, the IC 200 is in a state to active antenna calibration system with phase adjustment in a transmit path relative to a receive path according to an embodiment. In some embodiments, a transmit path is calibrated based on a receive path that was previously calibrated. For example, if the receive path has already been calibrated, then the transmit path can be calibrated even though the signal propagates from the transmit path to the receive path. In some embodiments, a signal can be transmitted and coupled to the receive path without impacting the operation of the antenna array system. This provides significant advantages over other calibration methods and systems that involve having to stop transmitting and/or receiving in order to calibrate the antenna array system. For example, in some embodiments, the antenna array system includes a time division duplexed (TDD) system where the transmit paths are enabled at different times than and receive paths, such that both transmit and receive paths are not simultaneously enabled. Under such a TDD system, the calibration can take place during a transmit duration where the transmitters are transmitting signals to the antenna elements for normal operation and a transmit signal is coupled to the receive path that is not coupled to an antenna. This method can be used to measure relative misalignment of both the transmit paths and the receive paths.

In the state corresponding to FIG. 2B, the transmitter 210 transmits a radio frequency signal to the antenna element network 230. A transmitter signal can be digitized using a DAC 212. The digitized signal can be frequency shifted using an IQ mixer 214. The frequency shifted signal can be split via a TX splitter 216. The split signals can propagate to the respective transmit paths (e.g., four split signals can continue to propagate to the first transmit path, the second transmit path, the third transmit path, the fourth transmit path). Each of the split signals can be phase shifted using the TX phase shifters 218 and amplified by the power amplifiers 220. Then, the signals can be sent to the antenna element network 230, where the transmit-to-receive coupler SPST switch 232 can determine which signals propagate to the respective receive paths. As illustrated in FIG. 2B, the switch 284A connecting the first receive path and the first transmit path can be closed, and the switches 284A connecting the other receive paths and transmit paths (e.g., the second receive path and the second transmit path) are open. Then, the split signal for the first transmit path continues to propagate to the first receive path. The signal of the first receive path can be amplified using the LNA 252A, phase shifted via the RF phase shifter 254A, propagate through the closed switch 255A and the RX combiner 256, mixed via the IQ mixer 258, digitized using the ADC 260, and signal processed using the digital signal processor (e.g., DLO Mixer 262). Then, the digital signal processor can measure the transmit signal that has propagated through the transmit path and the receive path.

The process of transmit path calibration can be repeated for the other transmit paths by switching on and off the switches of the transmit-to-receive coupler SPST switch 232 (e.g., for measurement of the signal propagating through the second transmit path and the second receive path, the switch connecting and is closed while the other switches are open). Each transmit path can be calibrated by determining a calibration coefficient, such as by applying the determined calibration coefficient to the TX phase shifters 218. In some embodiments, measured phase of a signal propagating through and is compared to the measured phase of a signal propagating through and, and the phase shifters of and/or are adjusted accordingly.

Figure 2C:
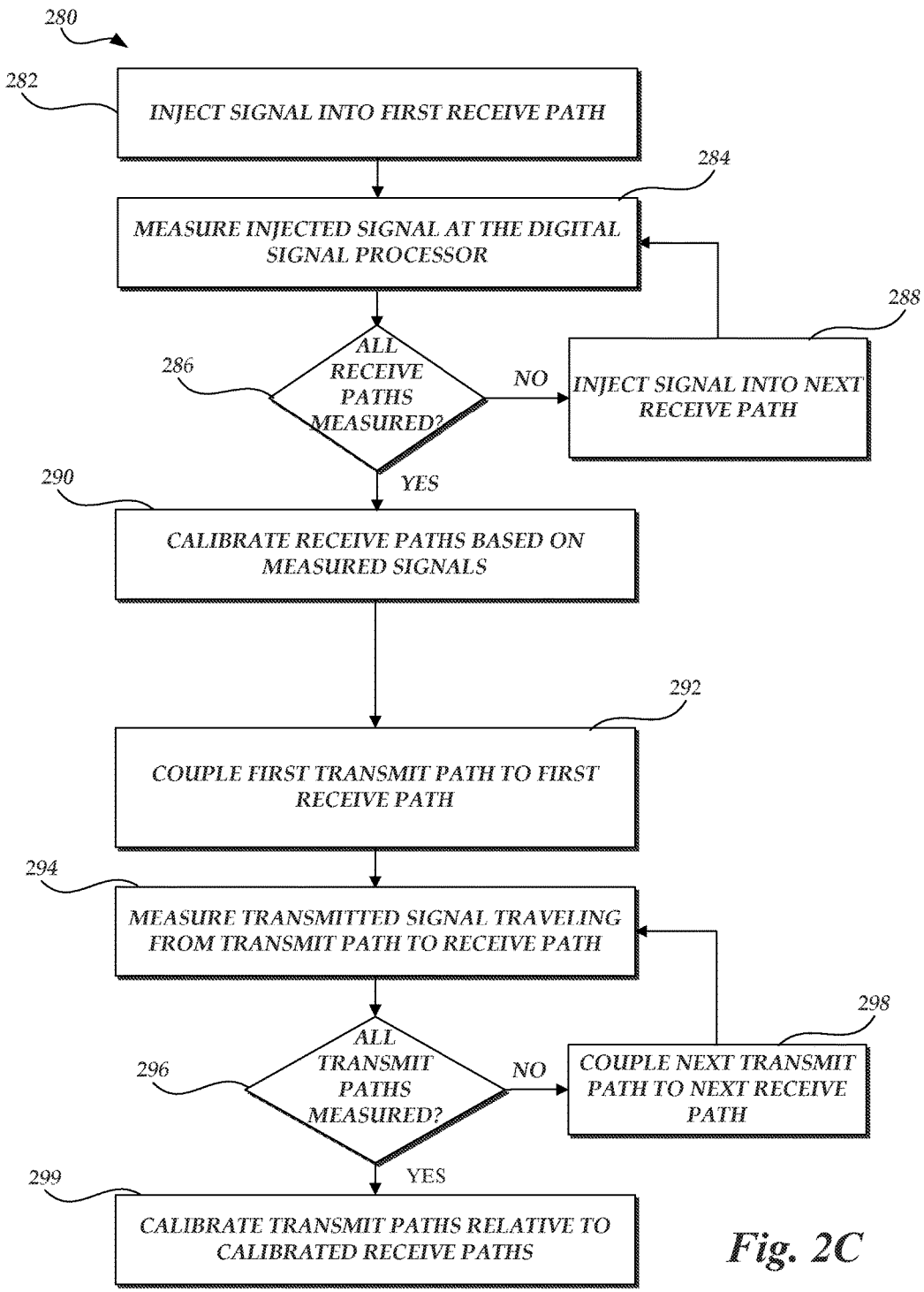
FIG. 2C is a flow diagram of an example process of active antenna calibration according to an embodiment.

FIG. 2C is a flow diagram of an example process 280 for performing active antenna calibration according to an embodiment. The process 280 can be performed using any suitable circuitry, such as the IC 200 of FIGS. 2A and 2B. The description of the process 280 includes references to some elements shown in FIGS. 2A and 2B for illustrative purposes, although other suitable circuitry can be used in one or more operations of the process 280. Any of the processes discussed herein may include more or fewer operations and the operations may be performed in any suitable order.

At block 282, a signal (e.g., a local oscillator signal from a transmit local oscillator) is injected into the first receive path (e.g., the first receive path of FIGS. 2A and 2B). The local oscillator signal may be generated from a local oscillator (such as the RF TX LO 271-1 of FIGS. 2A and 2B) based on a reference clock REF_CLK. The local oscillator signal can propagate through a cable 274 and a switch 276. The local oscillator signal can be split by a splitter 278. Each split signal can be injected into one or more receive paths.

At block 284, the injected signal is measured at the digital signal processor. The injected signal is processed by the receive path and provided to the digital signal processor for measurement. For example, the injected signal can be amplified by a low noise amplifier 252A, phase shifted by a RX phase shifter 254A, propagate through a switch 255A, combined by an RX combiner 256, frequency shifted by an IQ mixer 258, and digitized by an ADC 260. The digitized signal can be further conditioned before measurement (such as by a DLO mixer 262) in some embodiments.

At block 286, it can be determined whether the receive paths relative misalignments have been measured. This may include all available receive paths or a subset thereof. If all receive paths have not been measured, the local oscillator can be injected into the next receive path. For example, the local oscillator signal can be injected into the second receive path if the second receive path has not been measured. The injected signal into the second receive path can be measured at the digital signal processor at block 284. The injected signal propagates through the second receive path to the digital signal processor, which can result in different effects on the injected signal to be calibrated differently.

If all receive paths have been measured at block 286, the process 280 proceeds to block 290 where the receive paths are calibrated. This can provide each of the receive paths with a deterministic and accurate phase offset. Calibration can involve, for example, the receive paths being calibrated relative to one another by shifting the phase of the RX phase shifters 254 accordingly such that future measured signals of the receive paths have phase measurements substantially similar to one another. In some embodiments, the receive paths are calibrated one at a time. For example, phase is measured for the first and second receive paths and, and calibrated relative to each other. Then, the phase is measured for the third receive path, and calibrated relative to either the first or second receive path or, respectively.

At block 292, a transmit path can be coupled to a receive path. For example, the first transmit path is coupled to the first receive path. At block 294, a signal is transmitted from the transmitter 210, propagates through at least a portion of the first transmit path and the first receive path, and is measured by the digital signal processor.

At block 296, it is determined whether all of the transmit paths are measured. If not, then at block 298, the next transmit path is coupled to the next receive path. For example, a second transmit path is coupled to a second receive path after the first transmit path is coupled to the first receive path. In certain embodiments, all other couplers connecting transmit and receive paths are turned off. A signal (such as a local oscillator signal) is transmitted from the transmitter 210, propagates through the second transmit path and the second receive path, and is measured by the digital signal processor. If all transmit paths are measured (such as having measured signals propagating through each transmit path), then at block 299, the transmit paths are calibrated relative to each other. For example, the TX phase shifters are adjusted such that future signals propagating through a transmit and receive path will have substantially similar phase measurements (e.g., adjust the phase shifters such that a signal propagating through the first receive path and the first transmit path will have substantially the same phase as a signal propagating through the second receive path and the second transmit path). In certain embodiments, a subset of transmit paths may be calibrated before all transmit paths are measured. For example, a signal propagating through a first transmit path and a first receive path can be used to calibrate the first transmit path in relation to a first receive path that was previously already calibrated, such as by using the injected signal.

Figure 3A:
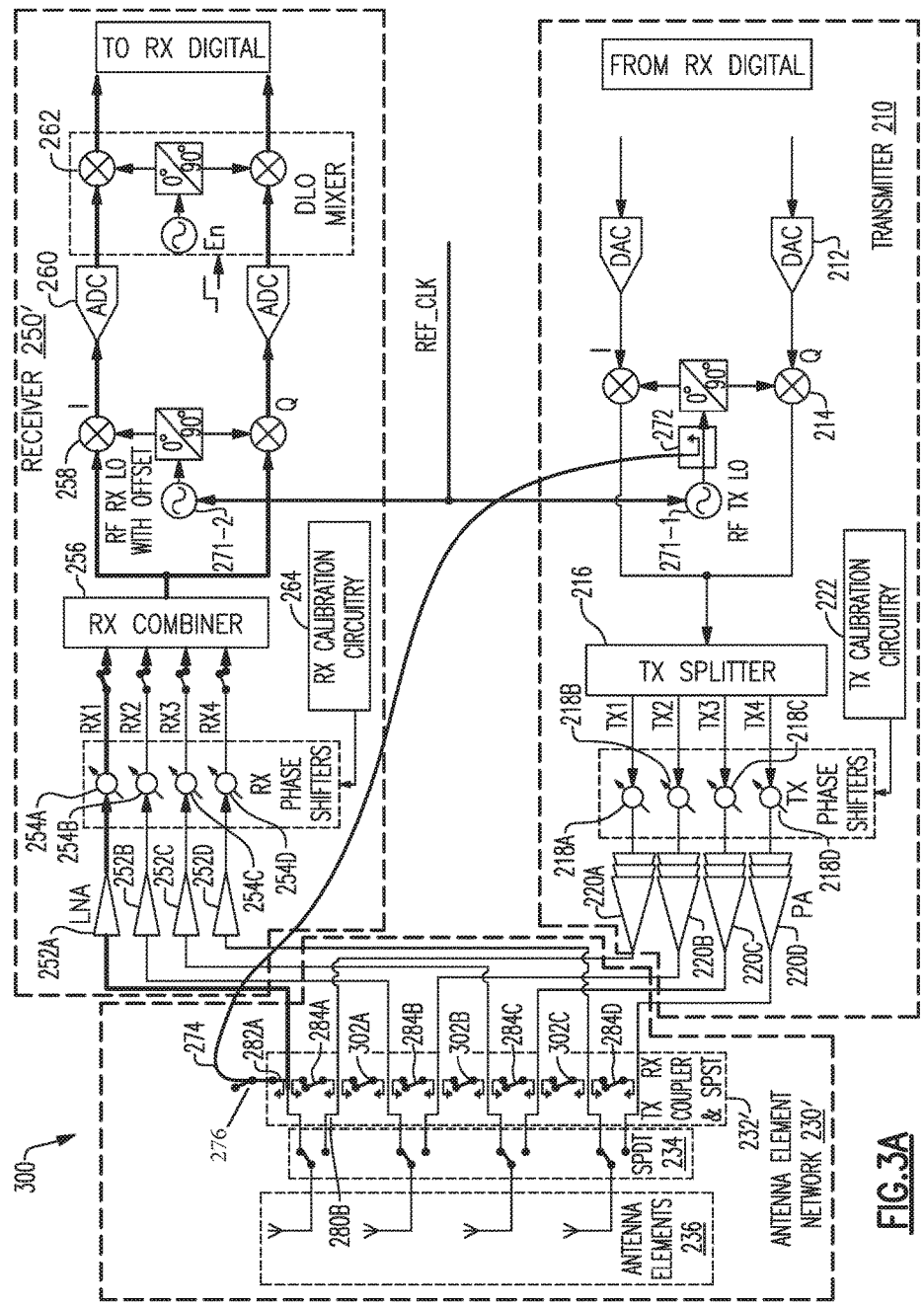
FIG. 3A is a schematic diagram of an active antenna calibration system according to an embodiment.
Figure 3C:
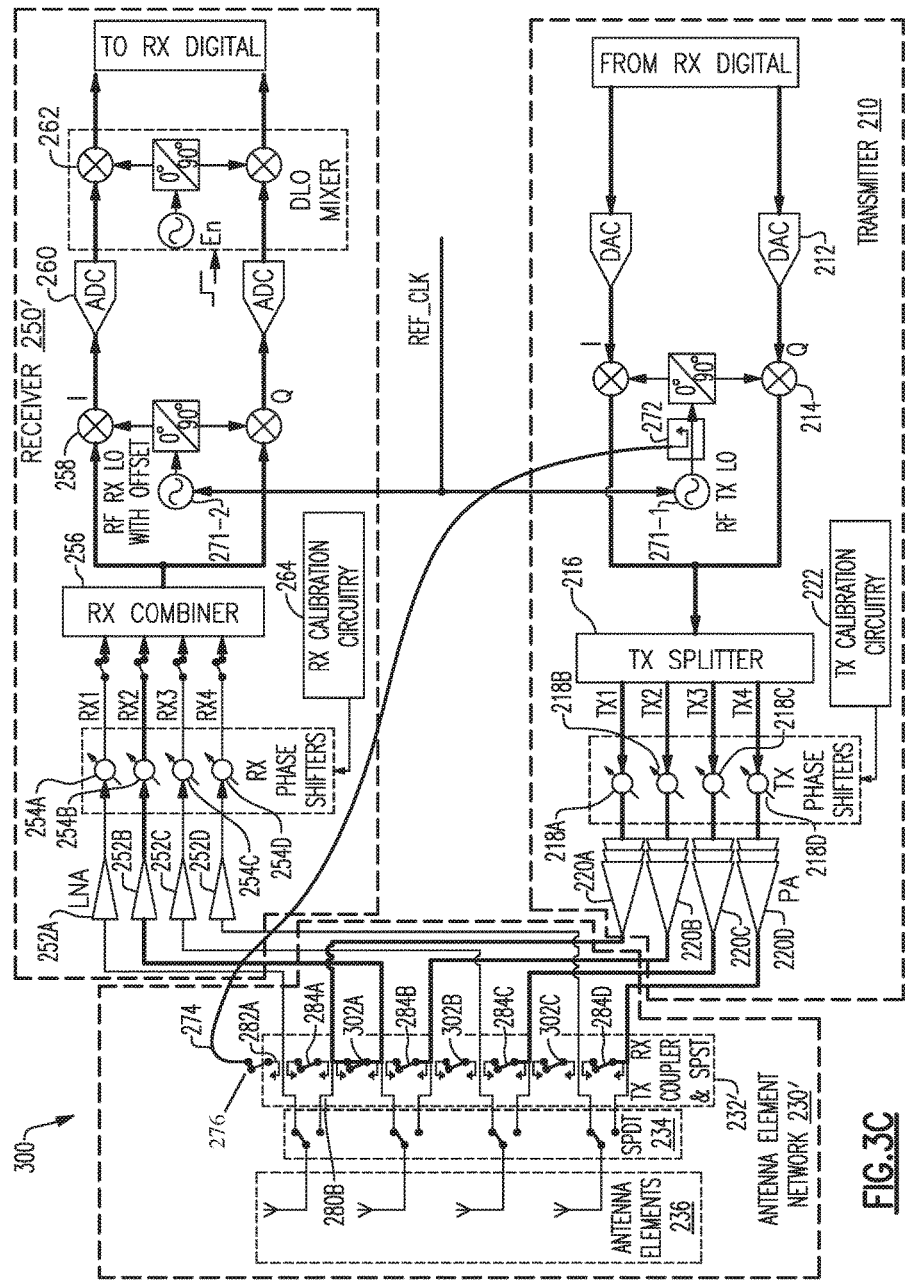
FIG. 3C is a schematic diagram of the active antenna calibration system of FIG. 3A in a different state than in FIGS. 3A and 3B.

Active Antenna Calibration System for Calibrating a Receive Path of an Integrated Circuit Based on a Calibrated Transmit Path FIGS. 3A-3C are schematic diagrams of an integrated circuit 300 of an active antenna calibration system according to an embodiment. The integrated circuit 300 can calibrate a receive path using a transmitter local oscillator signal, and then calibrate other paths using a previously calibrated path (e.g., calibrating a transmit path relative to the receive path, then calibrating another receive path relative to the already calibrated transmit path). The integrated circuit 300 is an example of the first IC 110 of FIG. 1 and can be implemented in accordance with any suitable principles and advantages discussed herein. FIG. 3A is a schematic diagram of an integrated circuit of an active antenna calibration system in a first state.

The IC 300 of FIGS. 3A to 3C is similar to the IC 200 of FIGS. 2A to 2B except that the signal distribution circuits and portions of the receive paths of these ICs are different. The different signal distribution circuit can facilitate a different method of calibration. The signal distribution circuit may include a coupler 272, a cable 274, a coupler 282, and switches 284A, 284B, 284C, 284D, 302A, 302B, 302C, 302D. As illustrated in FIG. 3A, the switch 276 is connected to a receive path (e.g., the first receive path), instead of being connected to a splitter 278 and another cable 280. In FIG. 3A, the RX phase shifters 254 are connected to the RX combiner 256 without an intervening switch. For instance, the switch 255 of FIGS. 2A and 2B can be omitted for calibration purposes by selectively coupling the transmit local oscillator signal to a selected receive path. The transmit-to-receive coupler SPST switch 232' of FIG. 3A can provide such selective coupling. In FIG. 3A, the transmit-to-receive coupler SPST switch 232' includes additional switches 302A, 302B, 302C (collectively referred to herein as 302) that couple the signal between a receive path and a transmit path configured to be connected to different antenna elements.

A reference clock REF_CLK, or a signal derived from the reference clock REF_CLK (e.g., a local oscillator signal) can be injected into a receive path (e.g., a first receive path). The reference clock REF_CLK can be provided to a local oscillator 271-1 that generates a local oscillator signal. The local oscillator signal can propagate along a cable 274 and be injected into the first receive path. A switch 276 can selectively inject the local oscillator signal into the first receive path. The injected signal can propagate through a first receive path, can be received by a receiver 250', and can be measured by a digital signal processor. The injected signal can be conditioned before being received by the digital signal processor. For example, the injected signal can be amplified by an amplifier (such as a low-noise amplifier 252A), phase shifted by a receive phase shifter 254A, propagate through a receive combiner 256, frequency shifted by an IQ mixer 258, and digitized by an analog-to-digital converter 260. The digitized signal can be conditioned before measurements are taken in certain applications (e.g., frequency shifted by a digital local oscillator mixer 262).

After the digital signal processor measures the signal, the first receive path relative calibration misalignment can be measured. Once a signal propagating through the first receive path of the integrated circuit 300 is measured, the first receive path of the integrated circuit 300 can be calibrated relative to other receive paths of other integrated circuits (e.g., the first receive path of the first IC 110 is calibrated relative to another first receive path of a second integrated circuit 112 for the active antenna calibration system 100).

FIG. 3B is a schematic diagram of the integrated circuit 300 in a second state. In the second state, a transmit path is calibrated relative to a receive path. In FIG. 3B, a signal is transmitted by the transmitter 210, propagates through a transmit path (e.g., a first transmit path), is coupled to a receive path (e.g., a first receive path), and measured by the digital signal processor. The switch 284A that connects the first transmit path to the first receive path is closed while the other switches 284B, 284C, 284D, 302A, 302B, 302C connecting other signal paths are open. In other embodiments, two or more couplers can be closed at the same time. In some embodiments, multiple receivers can be used in calibration.

FIG. 3C is a schematic diagram of the integrated circuit in a third state. In the third state, a receive path is calibrated relative to a previously calibrated transmit path. In FIG. 3C, a signal is transmitted by the transmitter 210, propagates through a transmit path, coupled to a receive path, and measured by the digital signal processor. In some embodiments, a transmit path (e.g., the first transmit path) is configured to be connected to a first antenna element of the antenna elements 236, and a receive path (e.g., the second receive path) is configured to be connected to a second antenna element of the antenna elements 236. A switch 302A can be used to connect these paths such that a signal is transmitted from a transmitter 210, propagates through a first transmit path, and propagates through a second receive path before being measured by the digital signal processor. A signal is transmitted by the transmitter 210, propagates through the first transmit path and a second receive path. Then, the second receive path is calibrated based on an already calibrated first transmit path.

In some embodiments, the process associated with the states of the IC 300 of FIGS. 3B and 3C is repeated for the other transmit paths and/or receive paths. For example, a second transmit path can be coupled to a second already-calibrated receive path using switch 284B, and the second transmit path can be calibrated. Then, a third receive path can be coupled to a second already-calibrated transmit path using switch 302B, and the third receive path can be calibrated. This process can be performed for all other transmit and receive paths.

Figure 3D:
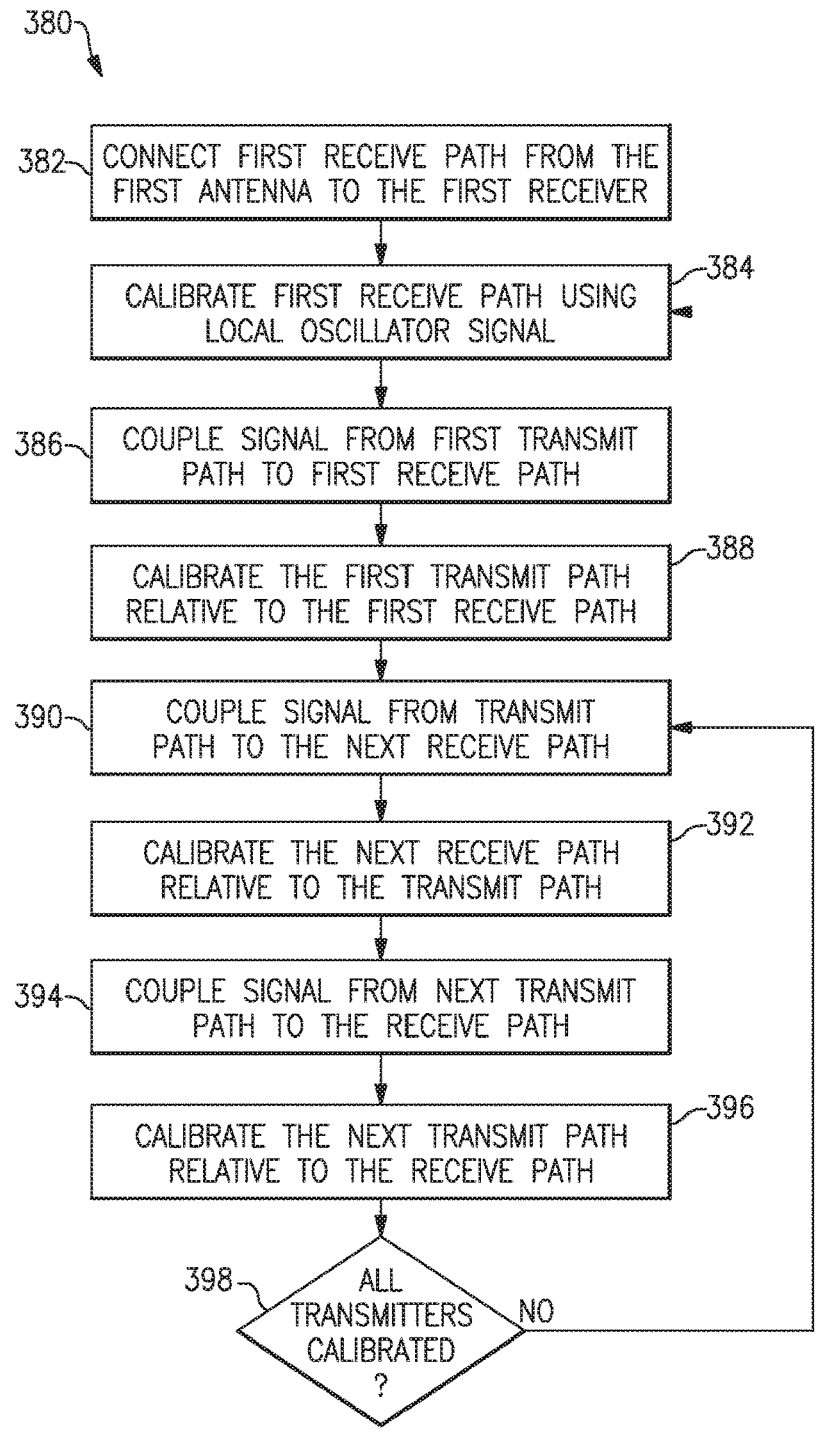
FIG. 3D is a flow diagram of an example process of active antenna calibration according to an embodiment.

FIG. 3D is a flow diagram of an example process 380 for performing active antenna calibration according to an embodiment. The process 380 can be performed using any suitable circuitry, such as the IC 300 of FIGS. 3A to 3C. The description of the process 380 includes references to some elements shown in FIGS. 3A to 3C for illustrative purposes, although other suitable circuitry can be used in one or more operations of the process 380.

At block 382, a local oscillator signal is injected into the first receive path. The local oscillator signal can be derived from the reference clock REF_CLK and generated by the RF TX LO 271-2. The local oscillator signal can alternatively be generated by a different local oscillator (such as the RF RX LO 271-2). The local oscillator signal can propagate through the cable 274, through a closed switch 276, coupled by a coupler 282A into the first receive path, and measured by the digital signal processor. Based on the measured signal, the first receive path is calibrated (e.g., by adjusting the phase shifter 254A) at block 384.

At block 386, a signal from the first transmit path is coupled to the first receive path. A signal is transmitted from the transmitter 210, propagates through the first transmit path, is coupled to the first receive path by the switch 284A, propagates through the receiver 250', and is measured by the digital signal processor. At block 388, based on the measured signal, the first transmit path can be calibrated (e.g., by adjusting the TX phase shifter 218A). This calibration can be based on the calibration of the first receive path at block 384.

At block 390, a signal from the calibrated transmit path (e.g., the first transmit path) is coupled to the next receive path (e.g., the second receive path). A signal is transmitted from the transmitter 210, propagates through the first transmit path, is coupled to the second receive path by the coupler 302A, propagates through the receiver 250', and is measured by the digital signal processor. At block 392, based on the measured signal, the second receive path can be calibrated (e.g., by adjusting the RX phase shifter 254B). This calibration can be based on the calibration of the first transmit path at block 388.

At block 394, a signal from the next transmit path (e.g., the second transmit path) can be coupled to the calibrated receive path (e.g., the second receive path). A signal is transmitted from the transmitter 210, propagates through the second transmit path, is coupled to the second receive path by the switch 284B, propagates through the receiver 250', and is measured by the digital signal processor. At block 386, based on the measured signal, the second transmit path can be calibrated (e.g., by adjusting the TX phase shifter 218B). This calibration can be based on the calibration of the second receive path at block 392.

At block 398, it is determined whether all transmitters are calibrated. If not, then the process 380 returns to block 390 to calibrate the next transmit path and the next receive path. In certain embodiments, the system can alternatively or additionally check if all receivers are calibrated (not shown). In certain embodiments, the process 380 can calibrate the next receive path or calibrates the next transmit path before checking whether all transmit and/or receive paths are calibrated.

Active Antenna Calibration System for Determining Misalignment and/or Optimizing Phase Adjustment Between a Receive Path and a Transmit Path Any suitable calibration circuitry can determine a relative phase difference and/or misalignment between a transmit path and a receive path. A calibration coefficient can be determined by the calibration circuitry and applied at a phase shifter in a transmit path and/or a receive path. Once calibration is complete, phase shifter settings can be adjusted to implement the calibration. To implement phase shifter settings, (1) relative offsets of phase shifter settings can be determined in advance and phase shifter settings can be determined relative to the calibration phase shifter settings, and/or (2) calibration can be performed as part of a successive-approximation method. Although components may be shown to be a part of the integrated circuit, these components, or other components that can perform similar functionality, can be a part of another circuit in communication with the integrated circuit. For example, a misalignment measurement circuit may be on a digital signal processor that interfaces with the integrated circuit.

The relative phase offsets of each of the phase shifter settings can be known in advance and the corrective adjustment to the phase shifter settings can be made relative to the calibration phase shifter settings, for example, to implement beamforming. An example of this will be described with reference to FIG. 4A. Calibration circuitry can facilitate this type of measurement where the relatively phase of all of the phase shifter settings on all of the transmit/receive lineups can be determined at the approximate times when the paths are inactive. This may impact throughput of network traffic for transmit paths, although certain sequencing can keep this impact at or near a minimum.

Figure 4A:
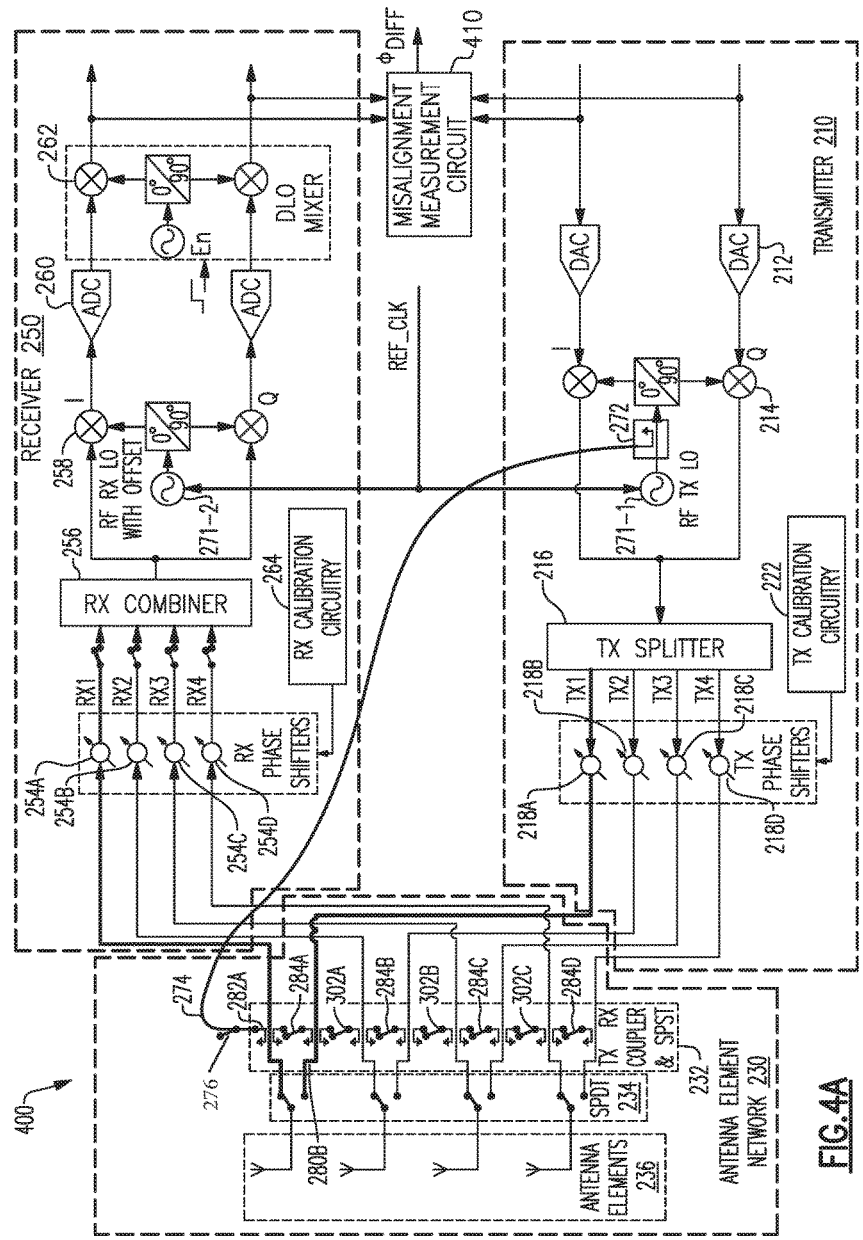
FIG. 4A is a schematic diagram of an active antenna calibration system with a measurement misalignment circuit according to an embodiment.

FIG. 4A is a schematic diagram of an integrated circuit 400 with active antenna calibration and a misalignment measurement circuit 410 according to an embodiment. The misalignment measurement circuit 410 can determine misalignment between a receive path and a transmit path. The misalignment measurement circuit 410 can be implemented by a digital signal processor for processing transmit and/or receive signals. Alternatively, the misalignment measurement circuit 410 can be implemented by dedicated circuitry. The integrated circuit 400 of FIG. 4A can be implemented in accordance with any suitable principles and advantages discussed herein. In certain embodiments, a signal is transmitted by the transmitter 210, propagates through a transmit path (e.g., a first transmit path), is coupled to a receive path (e.g., a first receive path) by the switch 284A, and measured by the digital signal processor. The switch 284A used to couple a signal from the first transmit path to the first receive path is closed while the other switches 284B, 284C, 284D for coupling signal to other signal paths are open. The phase of the signal received at the digital signal processor can be measured and compared with the phase of the signal transmitted by the transmitter 210 to derive a phase difference $\phi_{diff}$. This phase difference $\phi_{diff}$ can be used to determine the amount of phase shift to apply to a TX phase shifter 218 or/and the RX phase shifter 254.

Figure 4B:
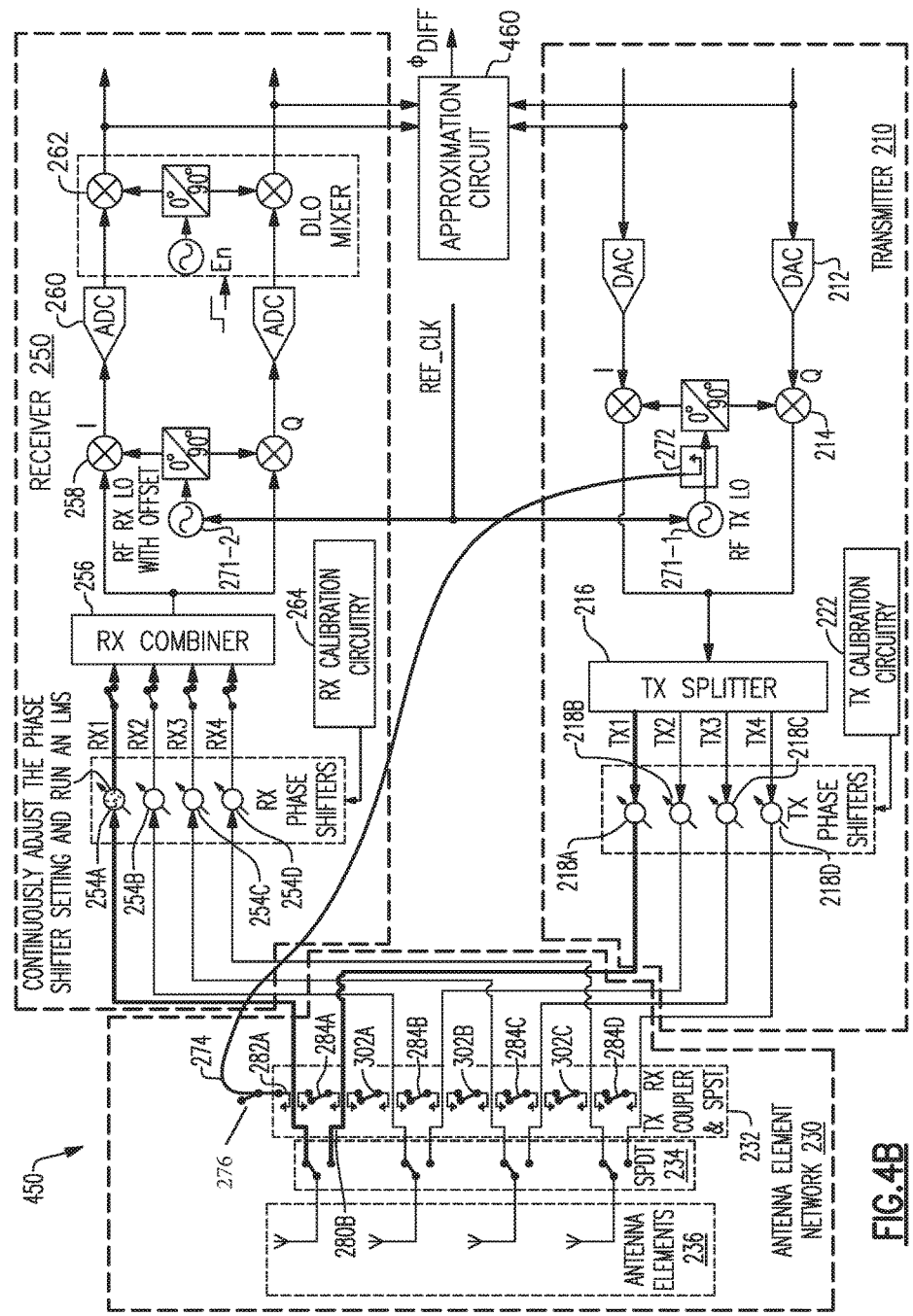
FIG. 4B is a schematic diagram of an active antenna calibration system with circuitry for optimizing calibration according to an embodiment.

FIG. 4B is a schematic diagram of an integrated circuit 450 with active antenna calibration an approximation circuit 460 according to an embodiment. The integrated circuit 450 of FIG. 4B is can be implemented in accordance with any suitable principles and advantages discussed herein. The approximation circuit 460 can be implemented by a digital signal processor for processing transmit and/or receive signals. Alternatively, the approximation circuit 460 can be implemented by dedicated circuitry. The approximation circuit 460 can implement a least means squared (LMS) algorithm and/or a successive approximation (SAR) algorithm. In certain embodiments, a signal is transmitted by the transmitter 210, propagates through a transmit path (e.g., a first transmit path), is coupled to a receive path (e.g., a first receive path) by the switch 284A, and measured by the digital signal processor. Then, the phase can be adjusted (e.g., incremented by one degree). Then, a signal can be transmitted again by the transmitter 210, propagates through a transmit path (e.g., a first transmit path), is coupled to a receive path (e.g., a first receive path), and measured by the digital signal processor. This process may be iterated for a number of different phase adjustments. Then based on the measurements, an improved and/or optimized phase adjustment can be selected (e.g., using a least-means-squared algorithm).

Several different methods of calibration may be used. In certain embodiments, the calibration may be performed on all phase shift settings (or a subset thereof) to determine an improved and/or optimized phase shifter setting. In some embodiments, an approximation can be made, and then the phase shifters can be used to narrow in on the optimized setting (e.g., used for more fine tuning purposes).

Active Antenna Calibration System for Digital Phase Adjustment

Figure 4C:
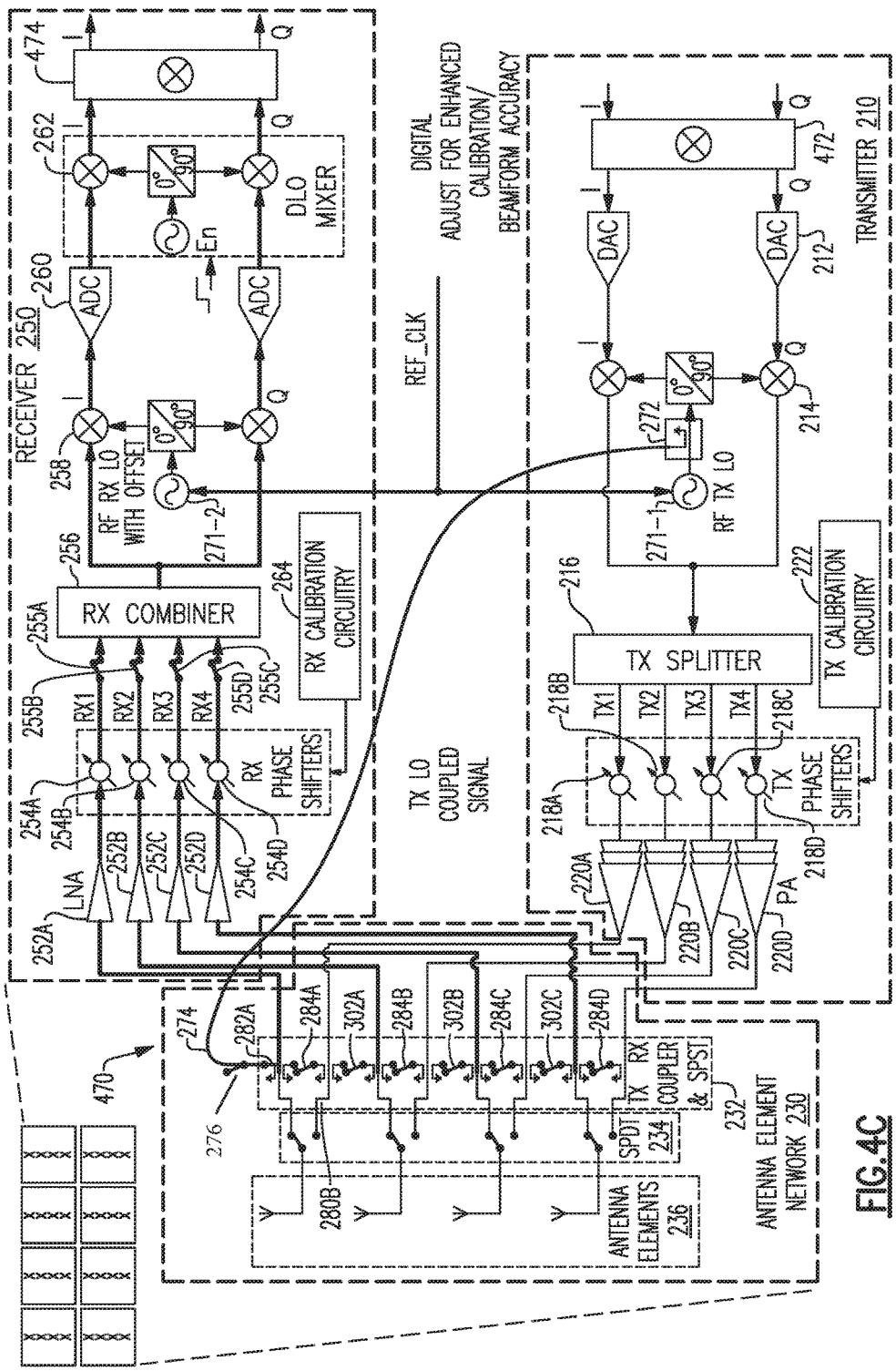
FIG. 4C is a schematic diagram of an active antenna calibration system with digital calibration adjustment according to an embodiment.

FIG. 4C is a schematic diagram of an active antenna calibration system 470 with digital calibration adjustment according to an embodiment. In certain embodiments, the phase adjustment can be performed digitally. Digital phase adjustment may be used partially or completely for phase adjustment. In some embodiments, RF phase adjustment can be used partially or completely for phase adjustment. In some embodiments, each IC can have one receiver and one transmitter. Thus, the phase of the IC can be adjusted for all transmit paths for the IC and/or all receive paths for the IC by phase adjustment in the digital domain. For example, in FIG. 4C, the digitized signal that is sent to the transmitter 210 can be phase adjusted using a TX digital phase shifter 472. This can shift the phase for all transmit paths. Each transmit path can further be phase shifted using the TX phase shifters 218. In FIG. 4C, signals received by the receiver 250 can be digitized, and the digitized signal can be phase shifted using a RX digital phase shifter 474. Thus, the RX digital phase shifter 474 can shift the phase for all signals propagating through the receive paths. Alternatively or additionally, the RX digital phase shifter 474, RX phase shifters 254 can be used to further adjust the phase of each receive path individually. Digital and/or RF phase shifters allow for flexibility in architectural design.

Even if the calibration measurement techniques offer near perfect misalignment measurement accuracy, the resolution of the phase shifters can be imperfect and can be crude in some instances. Typically, quoted numbers in the industry are within 3° with some error. However, a phase and/or amplitude shifter can be implemented in the digital domain for a transmitter and/or a receiver. Such a digital phase shifter can be accurate down to fractions of a degree. However, a digital phase shifter typically applies signals to groups of transmit and/or receive paths. If this digital phase shifter is set appropriately per transmit and receive path, then better overall accuracy can be achieved. FIG. 4D provides an example graph. Two elements (elements 1 and 3) are made more accurate by 3°. One element (element 2) has a net improvement by 1° (from +2° to −1°) and there is a degradation on element 4 by 3°. There is a net overall improvement in calibration accuracy.

FIG. 4D is a graph illustrating measurements of calibration accuracy for pre-digital calibration adjustment and post-digital calibration adjustment in an active antenna integrated circuit according to an embodiment. These measurements show that the pre-digital calibration adjustment performed with higher calibration accuracy, higher by the same accuracy degree regardless of whether the number of elements was 1, 2, 3, or 4.

Failure Analysis and Mitigation

Any of the calibration techniques discussed herein can be used to identify failures in active antenna ICs and/or take mitigating actions. For example, a failure in an IC can be identified using circuitry configured to perform calibration in accordance with any suitable principles and advantages discussed herein. Then mitigation action can be taken. For example beamforming re-calculation can be performed after failures are identified. As another example, broken transmit/receive lineups can be disabled. In some instances, failed lineups within ICs can be identified in germs of power amplifiers, low noise amplifiers, phase shifters, etc. can be identified. Then mitigating action can be taken. Typical mitigating actions that can be taken include generating an alarm to a central hub to indicate to an operator that a unit should be replaced. However, before replacement can occur, links can be maintained on a diminished capacity. For example, in an 8×8 array where there are 16 IC's, one IC might be non-functional. Instead of immediately decommissioning the unit, the calibration mechanism and the beamformers may be locally recalculated for functionality with 15 IC's where the 16$^{th}$ failed IC can be fully disabled. Performance is compromised but not fully disabled.

Applications

Any of the principles and advantages discussed herein can be applied to other systems, not just to the systems described above. The elements and operations of the various embodiments described above can be combined to provide further embodiments. Some of the embodiments described above have provided examples in connection with transceiver integrated circuits. However, the principles and advantages of the embodiments can be used in connection with any other systems, apparatus, or methods that could benefit from any of the teachings herein. For instance, any of the principles and advantages discussed herein can be implemented in connection with any devices with a need for calibration of transmit and receive paths. Although the digital signal processor is described for both transmitting and receiving, the digital signal processor may be multiple processors (e.g., a separate digital signal processors for a transmitter and a receiver). Although embodiments describe connecting paths via a coupler, other suitable components can be used to connect signal paths.

Aspects of this disclosure can be implemented in various electronic devices. Examples of the electronic devices can include, but are not limited to, consumer electronic products, parts of the consumer electronic products such as semiconductor die and/or packaged modules, electronic test equipment, wireless communication devices, personal area network communication devices, cellular communications infrastructure such as a base station, etc. Examples of the consumer electronic products can include, but are not limited to, a mobile phone such as a smart phone, a wearable computing device such as a smart watch or an ear piece, a telephone, a television, a computer monitor, a computer, a router, a modem, a hand-held computer, a laptop computer, a tablet computer, a personal digital assistant (PDA), a microwave, a refrigerator, a vehicular electronics system such as an automotive electronics system, a stereo system, a DVD player, a CD player, a digital music player such as an MP3 player, a radio, a camcorder, a camera such as a digital camera, a portable memory chip, a washer, a dryer, a washer/dryer, peripheral device, a clock, etc. Further, the electronic devices can include unfinished products.

CONCLUSION

Unless the context requires otherwise, throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. The word "or" in reference to a list of two or more items, is generally intended to encompass all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only, and are not intended to limit the scope of the disclosure. Indeed, the novel methods, apparatus, and systems described herein may be embodied in a variety of other forms; furthermore, various omissions, substitutions and changes in the form of the methods, apparatus, and systems described herein may be made without departing from the spirit of the disclosure. For example, circuit blocks described herein may be deleted, moved, added, subdivided, combined, and/or modified. Each of these circuit blocks may be implemented in a variety of different ways. The accompanying claims and their equivalents are intended to cover any such forms or modifications as would fall within the scope and spirit of the disclosure.

What is claimed is:

1. An integrated circuit for active antenna calibration, the integrated circuit comprising:
   receive paths including a first receive path, the first receive path including at least a portion of a signal path between a first active antenna element and a first mixer;
   transmit paths including a first transmit path, the first transmit path including at least a portion of a signal path between the first active antenna element and a second mixer;
   a signal distribution circuit configured to couple a local oscillator (LO) signal to the first receive path and to couple a transmit signal from the first transmit path to the first receive path; and
   calibration circuitry configured to generate a first calibration coefficient for the first receive path based on the LO signal, and generate a second calibration coefficient for the first transmit path based on a signal propagating through the first transmit path and the first receive path.

2. The integrated circuit of claim 1, wherein the calibration circuitry is further configured to generate a third calibration coefficient for a second receive path based on a signal propagating through the first transmit path and the second receive path.

3. The integrated circuit of claim 1, wherein the signal distribution circuit is further configured to couple the LO signal to a second receive path and to couple the transmit signal from a second transmit path to the second receive path.

4. The integrated circuit of claim 1, wherein the first transmit path comprises a phase shifter and the calibration circuitry is configured to provide the second calibration coefficient to the phase shifter to cause a phase associated with the first transmit path to be adjusted, wherein the transmit signal is a signal that is amplified by a power amplifier in the transmit path.

5. The integrated circuit of claim 1, wherein the calibration circuitry is to configured to generate the first calibration coefficient based on a least-means-squared algorithm.

6. The integrated circuit of claim 1, wherein the signal distribution circuit comprises a coupler and a switch coupled between a transmit local oscillator and the first receive path, and wherein the signal distribution circuit is configured to couple the LO signal from the transmit local oscillator to the first receive path.

7. The integrated circuit of claim 6, wherein the signal distribution circuit comprises a second switch configured to couple the transmit signal from the first transmit path to the first receive path.

8. The integrated circuit of claim 6, wherein the signal distribution circuit further comprises:
a splitter coupled between the switch and each of the receive paths;
receive path couplers coupled between the splitter and respective receive paths; and
matched traces electrically connecting the splitter to respective receive path couplers.

9. An active antenna system with active antenna calibration, the active antenna system comprising:
integrated circuits each configured to receive a matched clock signal, the integrated circuits comprising a first integrated circuit, the first integrated circuit comprising:
receive paths including a first receive path, the first receive path including at least a portion of a signal path between a first active antenna element and one or more analog-to-digital converters;
transmit paths including a first transmit path, the first transmit path including at least a portion of a signal path between the first active antenna element and one or more digital-to-analog converters;
a signal distribution circuit comprising a switch and a coupler connected between a transmit local oscillator and the first receive path, the signal distribution circuit configured to couple a transmit local oscillator (LO) signal from the transmit local oscillator to the first receive path; and
calibration circuitry configured to generate a calibration coefficient for the first receive path based on the transmit LO signal.

10. The active antenna system in claim 9, further comprising a local oscillator signal distribution circuit configured to distribute the matched clock signal to each of the integrated circuits.

11. The active antenna system of claim 9, wherein the calibration circuitry is further configured to generate a second calibration coefficient for the first transmit path based on a signal propagating through the first transmit path and the first receive path.

12. The active antenna system of claim 9, wherein the signal distribution circuit is further configured to couple a transmit signal from the first transmit path to the first receive path.

13. A method for active antenna calibration, the method comprising:
calibrating a first signal path based on a local oscillator (LO) signal, the first signal path including at least a portion of a signal path between a first active antenna element and a digital circuitry;
coupling a portion of a transmit signal from a second signal path to the first signal path, the second signal path including at least a portion of a signal path between the first active antenna element and the digital circuitry; and
calibrating the second signal path relative to the first signal path based on the portion of the transmit signal.

14. The method of claim 13, wherein the first signal path is a receive path, the second signal path is a transmit path, and the LO signal is coupled to the first signal path from a transmit local oscillator.

15. The method of claim 13, further comprising:
calibrating a third signal path based on the LO signal, the third signal path including at least a portion of a signal path between a second active antenna element and the digital circuitry; and
calibrating a fourth signal path relative to the third signal path, the fourth signal path including at least a portion of the signal path between the third active antenna element and the digital circuitry.

16. The method of claim 13, further comprising coupling the LO signal to the first signal path using a switch and a coupler coupled between an LO and the first signal path, wherein a first trace in an electrical connection between the switch and the first signal path is matched with a second trace in an electrical connection between the switch and another path.

17. The method of claim 13, further comprising:
coupling a third signal path to the second signal path; and
calibrating the third signal path relative to the second signal path, the third signal path including at least a portion of a signal path between a second active antenna element and the digital circuitry.

18. The method of claim 13, wherein:
calibrating the first signal path comprises connecting the first signal path to the digital circuitry while disconnecting at least another path from the digital circuitry; and
calibrating the second signal path comprises coupling the first signal path with second signal path while disconnecting the first signal path with at least another path.

19. The method of claim 13, wherein:
calibrating the first signal path comprises adjusting a first phase shifter; and
calibrating the second signal path comprises adjusting a second phase shifter.

20. The method of claim 19, wherein calibrating the further signal path further comprises performing a digital phase adjustment with the digital circuitry.

21. The method of claim 13, wherein the digital circuitry comprises at least one of:
shared circuitry configured to process signals associated with a first signal path and a second signal path; or
separate circuitry configured to process signals associated with a first signal path than circuitry configured to process signals associated with a second signal path.

22. The method of claim 13, further comprising identifying a failure based on said calibrating the second signal path; and performing a mitigating action in response to said identifying.

* * * * *